US009311711B2

(12) United States Patent
Kosaki

(10) Patent No.: US 9,311,711 B2
(45) Date of Patent: Apr. 12, 2016

(54) IMAGE PROCESSING APPARATUS AND IMAGE PROCESSING METHOD

(71) Applicant: TOSHIBA ALPINE AUTOMOTIVE TECHNOLOGY CORPORATION, Iwaki-shi (JP)

(72) Inventor: Masanori Kosaki, Iwaki (JP)

(73) Assignee: TOSHIBA ALPINE AUTOMOTIVE TECHNOLOGY CORPORATION, Iwaki-shi (JP)

(*) Notice: Subject to any disclaimer, the term of this patent is extended or adjusted under 35 U.S.C. 154(b) by 0 days.

(21) Appl. No.: 14/484,450

(22) Filed: Sep. 12, 2014

(65) Prior Publication Data

US 2015/0269733 A1    Sep. 24, 2015

(30) Foreign Application Priority Data

Mar. 24, 2014  (JP) ................................. 2014-060739

(51) Int. Cl.
*G06K 9/00* (2006.01)
*G06T 7/00* (2006.01)
*G06K 9/74* (2006.01)

(52) U.S. Cl.
CPC .......... *G06T 7/0044* (2013.01); *G06K 9/00805* (2013.01); *G06K 9/74* (2013.01); *G06T 7/0046* (2013.01); *G06T 7/0061* (2013.01); *G06T 2200/21* (2013.01); *G06T 2207/20004* (2013.01); *G06T 2207/20016* (2013.01); *G06T 2207/20041* (2013.01); *G06T 2207/30232* (2013.01); *G06T 2207/30241* (2013.01); *G06T 2207/30252* (2013.01); *G06T 2207/30256* (2013.01); *G06T 2207/30261* (2013.01); *G06T 2211/428* (2013.01); *G06T 2215/16* (2013.01)

(58) Field of Classification Search
None
See application file for complete search history.

(56) References Cited

FOREIGN PATENT DOCUMENTS

| JP | 2006-107422 | 4/2006 |
|---|---|---|
| JP | 2006-133125 | 5/2006 |
| JP | 2010-44438 | 2/2010 |
| JP | 2010-55195 | 3/2010 |
| JP | 2012-98796 | 5/2012 |
| WO | WO 2013/009697 A1 | 1/2013 |

OTHER PUBLICATIONS

Tsai, Yi-Min, et al. "An intelligent vision-based vehicle detection and tracking system for automotive applications." Consumer Electronics (ICCE), 2011 IEEE International Conference on. IEEE, 2011.*
Extended European Search Report issued Aug. 21, 2015 in Patent Application No. 14184564.4.
Yi-Min Tsai, et al., "An Intelligent Vision-based Vehicle Detection and Tracking System for Automotive Applications" 2011 IEEE International Conference on Consumer Electronics, Jan. 9, 2011, 2 Pages.

* cited by examiner

*Primary Examiner* — Bhavesh Mehta
*Assistant Examiner* — Amandeep Saini
(74) *Attorney, Agent, or Firm* — Oblon, McClelland, Maier & Neustadt, L.L.P.

(57) ABSTRACT

According to one embodiment, an image processing apparatus includes a processed-image generating unit, a detection unit, and a calculation unit. The processed-image generating unit generates processed images by scaling the image picked up by the camera provided on a vehicle by respective ones of scale factors. The detection unit scans each processed image by a frame, determines likelihood using a dictionary of the detection object, and detects a scan frame having high likelihood. Each processed image is associated with respective image distance which is a predetermined estimated distance from the vehicle. The calculation unit determines an estimated distance from the vehicle to the detection object according to an image distance associated with a processed image to which the detected scan frame belongs, and calculates and outputs, based on a history of determined estimated distances and on the image distances, a time until the vehicle and the detection object collide.

14 Claims, 16 Drawing Sheets

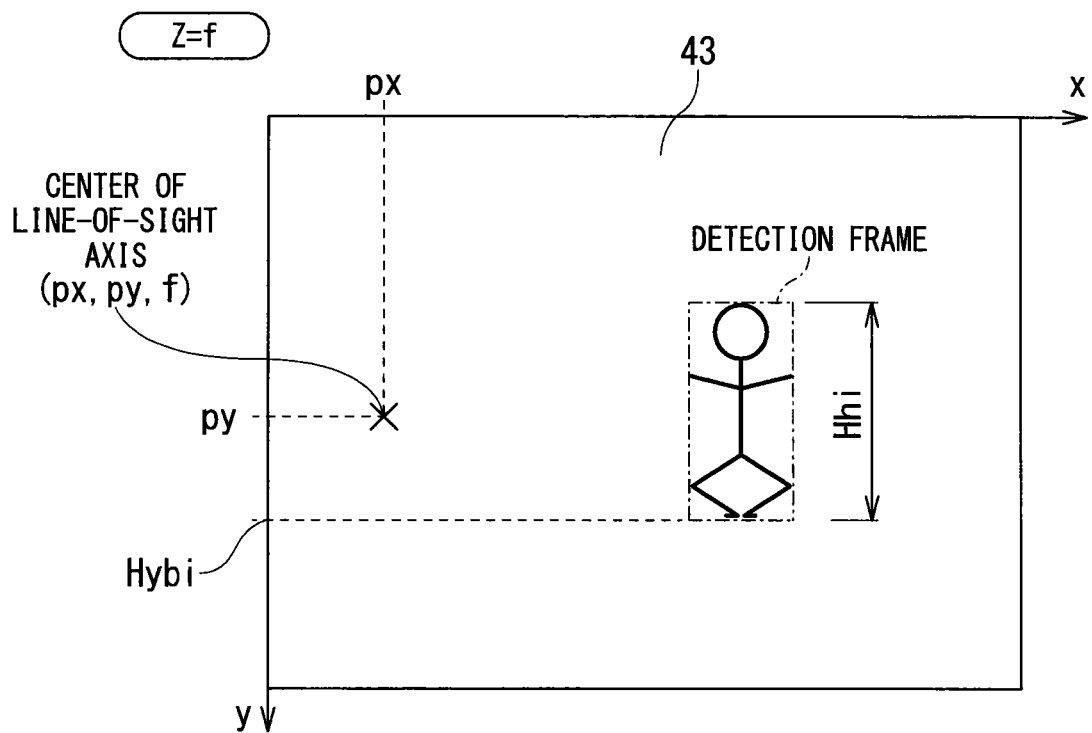
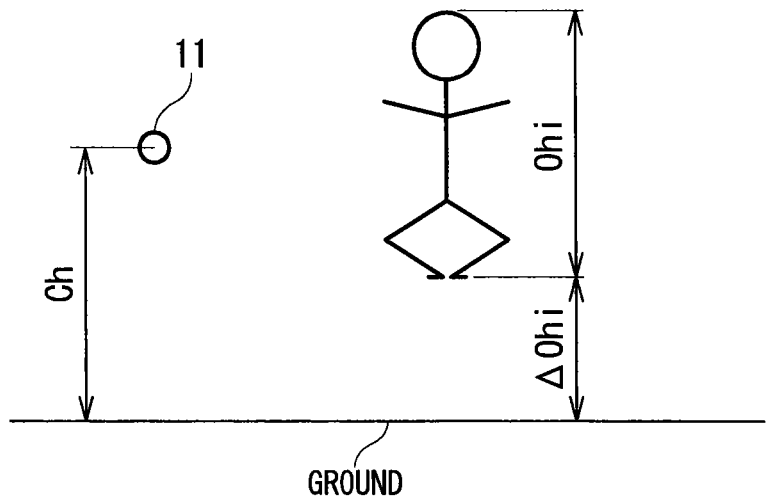
FIG. 9

IMAGE PROCESSING APPARATUS AND IMAGE PROCESSING METHOD

CROSS-REFERENCE TO RELATED APPLICATIONS

This application claims the benefit of priority of Japanese Patent Application No. 2014-060739, filed Mar. 24, 2014, the entire contents of which are incorporated herein by reference.

FIELD

Embodiments described herein relate generally to an image processing apparatus and an image processing method.

BACKGROUND

Recently, as a technique for preventing a vehicle such as an automobile or a predetermined object such as a street light on a shoulder from colliding with an object relatively approaching the predetermined object, there has been demand for development of a technique for predicting time to collision (TTC) between the predetermined object and the object. This type of technique includes, for example, a technique for predicting the time to collision between the vehicle and the object based on images picked up by a surveillance camera such as a camera mounted on the vehicle or a camera fixedly mounted a street light. When images picked up by a vehicle-mounted camera are used, since digitized image data is used unlike when a radar is used, complex determinations on an approach angle of the object and the like can be made.

Conventionally, this type of techniques include, for example, a technique for predicting the time to collision (TTC) based on scaling-up factors of an object in a source image and a technique for predicting the time to collision (TTC) based on a position of the ground and a position of the object in the source image.

On the other hand, image processing techniques for detecting objects in source images have advanced remarkably in recent years, aiming at reducing a time required for detection while improving detection accuracy. This type of object detection techniques includes, for example, a technique which uses a HOG (Histogram of Oriented Gradients) feature value.

An object detection process (hereinafter referred to as a HOG process) which uses a HOG feature value can detect an object by scaling up and down a single source image in a predetermined period of time, thereby preparing plural images (hereinafter referred to as an image pyramid), and scanning each of the plural images using a frame of a same size.

The plural images making up an image pyramid differ from one another in a scaling factor and the object is shown in different sizes in the plural images. Consequently, with a technique for detecting an object using an image pyramid, a distance to the object can be predicted approximately from the scaling factor of a component image in which a scanned frame and the object almost coincide in size out of component images of the image pyramid.

However, the scaling factor of each component image of the image pyramid is a discrete value, making it difficult for the technique for detecting an object using an image pyramid to accurately predict the time to collision (TTC). Also, if the technique for predicting TTC based on scaling-up factors of an object in a source image is applied to the technique for detecting an object using an image pyramid, a scaling-up factor of the object takes an outlier, making it difficult to accurately predict TTC. Also, when the position of the ground is used as with the technique for predicting TTC based on a position of the ground and a position of the object in the source image, error will become very large in distant locations.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 9 is an explanatory diagram illustrating an example of a focus position image in which a person floating from the ground by a predetermined height is detected;

DETAILED DESCRIPTION

Hereinbelow, a description will be given of an image processing apparatus and an image processing method according to embodiments of the present invention with reference to the drawings.

In general, according to one embodiment, an image processing apparatus includes a processed-image generating unit, a detection unit, and a calculation unit. The processed-image generating unit acquires an image around a vehicle picked up by a camera provided on the vehicle and generates a plurality of processed images by scaling the image picked up by the camera by a corresponding plurality of scale factors. The detection unit scans each of the plurality of processed images by a frame having a predetermined size according to a detection object, and determines likelihood at each scanning position using a dictionary of the detection object. The detection unit also detects a scan frame having likelihood higher than predetermined likelihood. The plurality of processed images is associated in advance with a corresponding plurality of image distances, where each of the plurality of image distances is a predetermined estimated distance from the vehicle. The calculation unit determines a determined estimated distance from the vehicle to the detection object according to an image distance associated with a processed image to which the scan frame detected by the detection unit belongs. The calculation unit also calculates and outputs, based on a history of determined estimated distances and on the plurality of image distances, a time until the vehicle and the detection object collide with each other.

Figure 1:
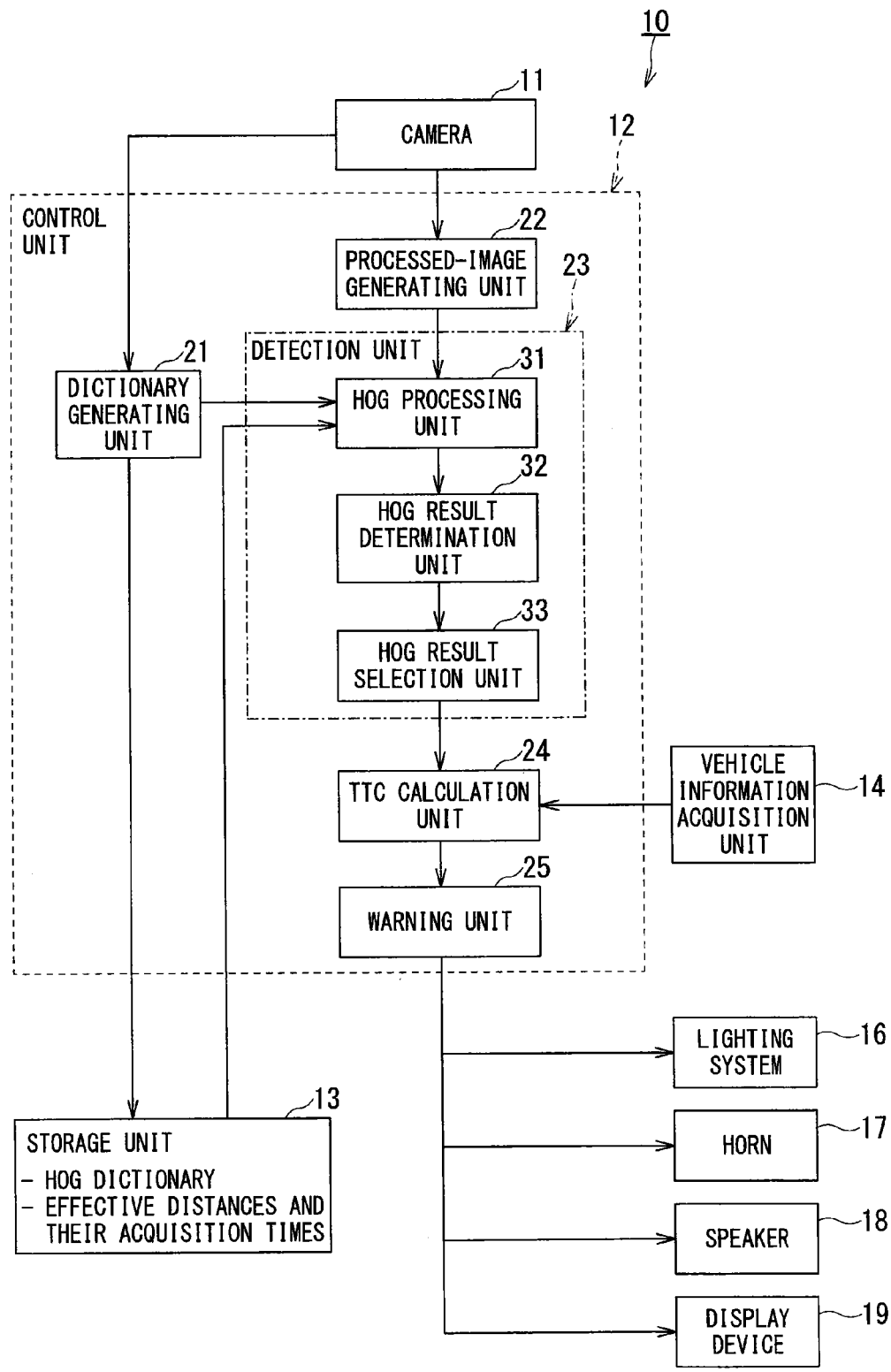
FIG. 1 is a block diagram showing a configuration example of the image processing apparatus according to an embodiment of the present invention.

FIG. 1 is a block diagram showing a configuration example of the image processing apparatus 10 according to an embodiment of the present invention.

The image processing apparatus 10 includes a camera 11, a control unit 12, a storage unit 13, a vehicle information acquisition unit 14, a lighting system 16, a horn 17, a speaker 18, and a display device 19.

The camera 11, which is configured with a CCD (Charge Coupled Device) image sensor or CMOS (Complementary Metal Oxide Semiconductor) image sensor, generates image data by capturing video images around a vehicle such as a private car and gives the image data to the control unit 12.

For example, for rearward monitoring, a camera 11 is provided near a rear number plate of the vehicle or in upper part of a rear window (rear camera). Also, to monitor conditions on sides of the vehicle, cameras 11 are provided near side mirrors (side cameras). Also, to monitor conditions ahead of the vehicle, a camera 11 is provided near a front number plate of the vehicle or in upper part of a front window (front camera).

The camera 11 may be equipped with a wide-angle lens or fisheye lens to enable wide angle imaging. If a camera 11 capable of wide angle imaging is disposed near a side mirror (side camera), conditions ahead of and behind the vehicle can be picked up simultaneously with conditions on sides of the vehicle. Also, images of a wider range around the vehicle may be captured using plural cameras 11.

In an example described below, the camera 11 is equipped with a wide-angle lens or fisheye lens to enable wide angle imaging.

The control unit 12 is made up, for example, of a microcontroller equipped with a CPU, RAM, and ROM. The CPU of the control unit 12 loads an image processing program and data necessary for execution of the program into the RAM from a storage mediums such as the ROM and performs processes to detect a detection object contained in a processed image using an image pyramid according to the program and predict TTC (time to collision) of the detected detection object accurately, where the image pyramid is generated from images acquired by the camera 11.

The RAM of the control unit 12 provides a work area to temporarily store programs executed by the CPU and related data. A storage medium such as the ROM of the control unit 12 stores the image processing program as well as various data needed in order to execute the program.

Note that the storage media such as the ROM may be configured to include a recording medium readable by the CPU, such as a magnetic or optical recording medium or a semiconductor memory, and download some or all of programs and data onto these storage media from an electronic network via a network connection unit (not shown).

In this case, the network connection unit supports various information and communications network protocols to accommodate different forms of network and connects the control unit 12 with an ECU or other electric equipment of other vehicles via the electronic network according to appropriate ones of the various protocols. An electric connection via the electronic network can be used for this connection. The electronic network here means an information and communications network in general using telecommunications technology and can be any of a wireless/wired LAN (Local Area Network) or the Internet, a telephone communications network, an optical-fiber communications network, a cable communications network, and a satellite communications network.

The storage unit 13 is a non-volatile memory from/into which the control unit 12 can read and write data and stores various information including an image dictionary (models) generated in advance using images obtained by picking up a detection object. The stored information may be updated via the electronic network or via a portable storage medium such as an optical disc.

The vehicle information acquisition unit 14 acquires at least current acceleration information about an own car and outputs the information to the control unit 12. The vehicle information acquisition unit 14 may be made up, for example, of an acceleration sensor or may be equipped with a vehicle information acquisition function commonly used on a CAN (Controller Area Network). In the present embodiment, it is not necessary to install the vehicle information acquisition unit 14.

The lighting system 16, which is made up of typical headlights, flashes (so-called passing) under the control of the control unit 12 and thereby gives a warning, for example, to outside of an own vehicle.

The horn 17 outputs a warning sound to outside of the own vehicle under the control of the control unit 12.

The speaker 18 is provided inside the own vehicle. The speaker 18, under the control of the control unit 12, outputs a beep sound or outputs other sounds corresponding to various information to inform a driver of the own vehicle about an imminent danger.

The display device 19, which is provided at a location visible to the driver, can be a typical vehicle-mounted display, car navigation system, or HUD (head-up display). Under the control of the control unit 12, the display device 19 displays various information including a source image of the camera 11 or an image which indicates a detection position of a detection object.

(Outline of Configuration and Operation of Control Unit 12)

Next, configuration and operation of the control unit 12 whose functions are implemented by the CPU will be outlined.

As shown in FIG. 1, the CPU of the control unit 12 functions at least as a dictionary generating unit 21, a processed-image generating unit 22, a detection unit 23, a TTC calculation unit 24, and a warning unit 25 by operating according to a program. The detection unit 23 includes a HOG processing unit 31, a HOG result determination unit 32, and a HOG result selection unit 33.

Each of the units 21 to 25 uses a required work area of the RAM as a temporary data storage location. Note that the units which implement these functions may be provided by hardware logic such as circuits without using the CPU.

Figure 2:
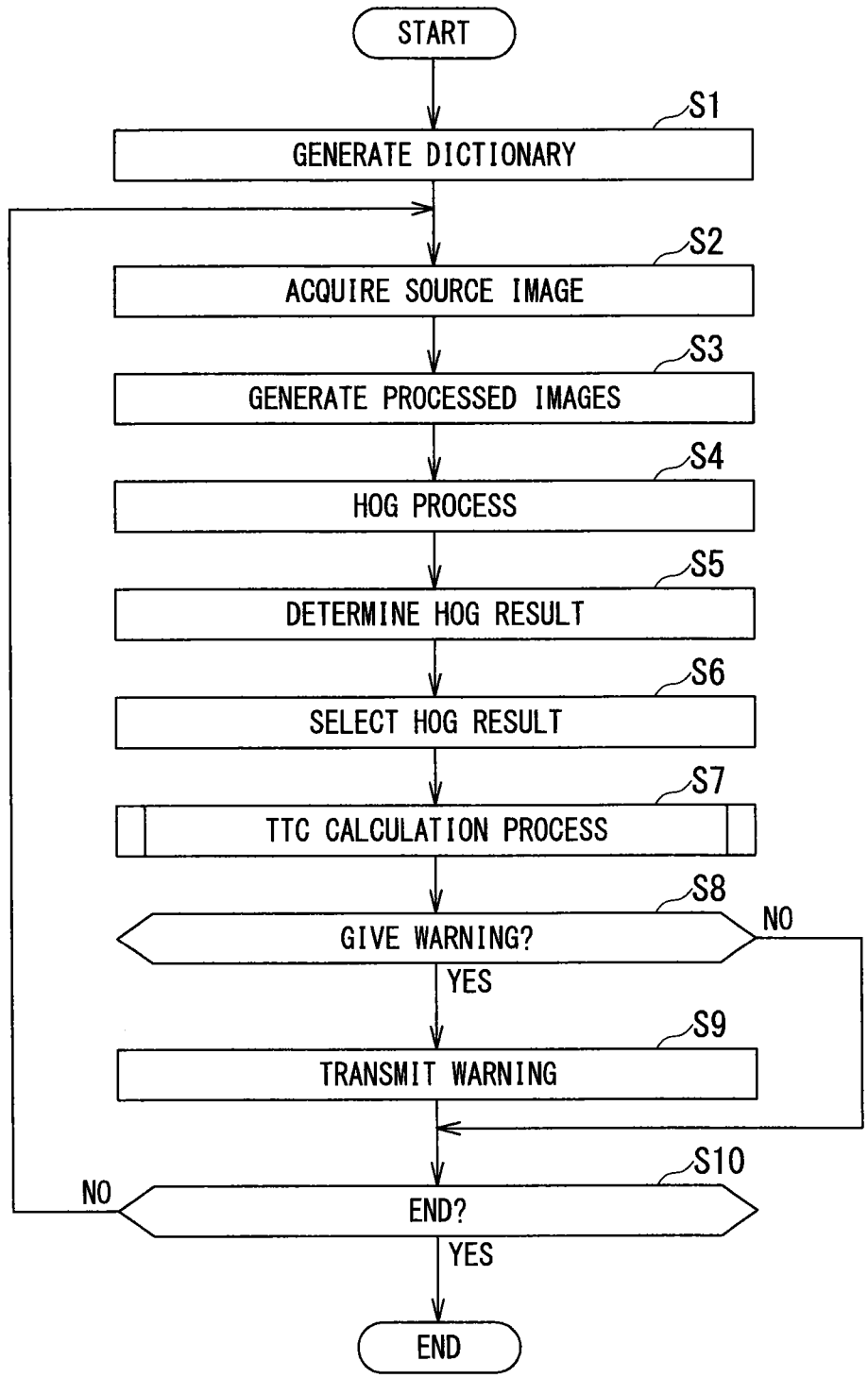
FIG. 2 is a flowchart outlining procedures for detecting a detection object contained in a processed image using an image pyramid generated from images acquired by the camera and accurately predicting the TTC of the detected detection object, where the procedures are carried out by the CPU of the control unit shown in FIG. 1.

FIG. 2 is a flowchart outlining procedures for detecting a detection object contained in a processed image using an image pyramid generated from images acquired by the camera 11 and accurately predicting the TTC (time to collision) of the detected detection object, where the procedures are carried out by the CPU of the control unit 12 shown in FIG. 1. In FIG. 2, each number preceded by the letter S represents a step of the flowchart.

In step S1, the dictionary generating unit 21 generates an image dictionary (models) in advance using images obtained by picking up a detection object and stores the image dictionary in the storage unit 13. For example, by placing the detection object at plural locations in a predetermined range in an imaging range such that a predetermined line-of-sight axis of the camera 11 and a direction of a normal to a detection plane of the detection object will be parallel to each other, the dictionary generating unit 21 generates a dictionary in advance using an image of the detection object picked up by the camera 11 at each of the plural locations.

The dictionary generated by the dictionary generating unit 21 has content applicable to various techniques for detecting an object based on feature values. In an example described below, it is assumed that the dictionary generated by the dictionary generating unit 21 is dictionary (hereinafter referred to as a HOG dictionary) suitable for an object detection process (a HOG process) which uses a HOG feature value and that the detection unit 23 performs the HOG process.

Next, in step S2, the processed-image generating unit 22 acquires a source image picked up by the camera 11 at a wide field angle around the vehicle.

Next, in step S3, based on the source image produced by the camera 11, the processed-image generating unit 22 generates an image group (image pyramid) made up of plural processed images differing in a distance of a projection plane set from an own car 41. Each processed-image is generated as an image perspectively projected onto a projection plane whose direction of a normal coincides with the line-of-sight axis used for dictionary generation. Each processed-image is associated beforehand with an image distance which is an estimated distance from the own car 41.

Next, in step S4, the HOG processing unit 31 of the detection unit 23 performs a HOG process (see, for example, JP-A 2010-44438 and JP-A 2010-55195) and thereby outputs likelihood. Specifically, the HOG processing unit 31 converts processed images into oriented gradient images, scans a frame of a predetermined size according to the detection object, determines a HOG feature value at each scanning position using a HOG dictionary of the detection object, and thereby determines likelihood which represents the possibility that the detection object exists at the scanning position. The HOG processing unit 31 can find the likelihood (score) by fitting the framed image at each scanning position in the dictionary. It can be said that the higher the likelihood, the more closely the image matches the dictionary.

The HOG feature value quantifies the extent to which longitudinal, lateral, and diagonal edges are contained in a block. Consequently, it is known that the HOG feature value is less susceptible to changes in brightness and is robust to changes in shape. Note that the HOG process performed by the HOG processing unit 31 may be a process which uses co-occurrence (coHOG process).

Next, in step S5, the HOG result determination unit 32 of the detection unit 23 regards a result as effective when the likelihood obtained by the HOG processing unit 31 is larger than a predetermined likelihood threshold. When scan frames are scanned by the HOG processing unit 31 in the HOG process, the smaller the amount of pixel shift and smaller the threshold of likelihood, the larger the number of scan frames regarded as effective results by the HOG result determination unit 32.

Next, in step S6, the HOG result selection unit 33 of the detection unit 23 selects the most effective result by choosing the one with the highest likelihood from the plural effective results obtained by the HOG result determination unit 32 or by using a simple average, likelihood-based weighted average, or the like of the plural effective results. The HOG result selection unit 33 may directly output the estimated distance from the own car associated with the same or closest processed image based on the selected most effective result. The HOG result determination unit 32 herein, outputs a frame (hereinafter referred to as a detection frame) obtained by normalizing size and position of the frame of the selected most effective result onto an image serving as a reference (reference image, hereinafter referred to as a normalized image). That is, the longer the distance, the smaller the detection frame, and the shorter the distance, the larger the detection frame resulting from conversion. Note that when a single scan frame is determined to be an effective result by the HOG result determination unit 32, step S6 may be omitted.

Next, in step S7, the TTC calculation unit 24 determines an estimated distance as a determined estimated distance from the own car to a detection object based on a size relationship between the normalized image and detection frame. Then the TTC calculation unit 24 calculates and outputs the time TTC until the own car collides with the detection object based on a history of estimated distances as well as on image distances (hereinafter collectively referred to as pyramidal image distances as appropriate), which are the estimated distances from the own car associated with plural processed images. In so doing, when a single frame is detected or a single result with the highest likelihood is selected, a distance of the detection frame coincides with one of the pyramidal image distances.

The distances from the own car associated respectively with plural processed images take discrete values. The TTC calculation unit 24 can determine TTC more accurately using the history of estimated distances and the pyramidal image distances rather than using estimated distances as they are.

Next, in step S8, the warning unit 25 determines whether to notify the driver of the own car of information outputted from the TTC calculation unit 24, where the outputted information includes the estimated distance from the own car to the detection object as well as TTC information. When it is determined that the output information from the TTC calculation unit 24 is to be notified, the control unit 12 goes to step S9. On the other hand, when there is no need to notify the driver, the control unit 12 goes to step S10. For example, it is advisable to determine to notify the user when the detection object is located within a predetermined distance from the own car or when the TTC is within a predetermined time. Note that step S8 may be omitted.

Next, in step S9, the warning unit 25 transmits the output information from the TTC calculation unit 24 to the driver of the own car using at least one of a voice output via the speaker 18, a buzzer output via the speaker 18, and a warning display on the display device 19, and then the control unit 12 goes to step S10. For example, the warning unit 25 displays the normalized image superimposed with an image which represents distance information and TTC information on the display device 19, where the distance information concerns the distance from the own car to the detection object. Also, the warning unit 25 may give a warning notice to outside of the own vehicle by flashing (so-called passing) by the lighting system 16 or producing a warning sound from the horn 17.

Next, in step S10, the control unit 12 determines whether to finish the series of procedures. For example, when the own car remains stopped for a predetermined period of time or longer or when the driver enters a command, the series of procedures is finished. If the procedures are to be continued, the control unit 12 returns to step S2 to acquire an image of a next frame from the camera 11 and repeat processes of steps S3 to S9.

The above procedures makes it possible to detect a detection object contained in processed images using an image pyramid generated from images acquired by the camera 11 and accurately predict the TTC (time to collision) of the detected detection object.

(Dictionary Generation)

Now the dictionary generated by the dictionary generating unit 21 according to the present embodiment will be described.

Figure 3:
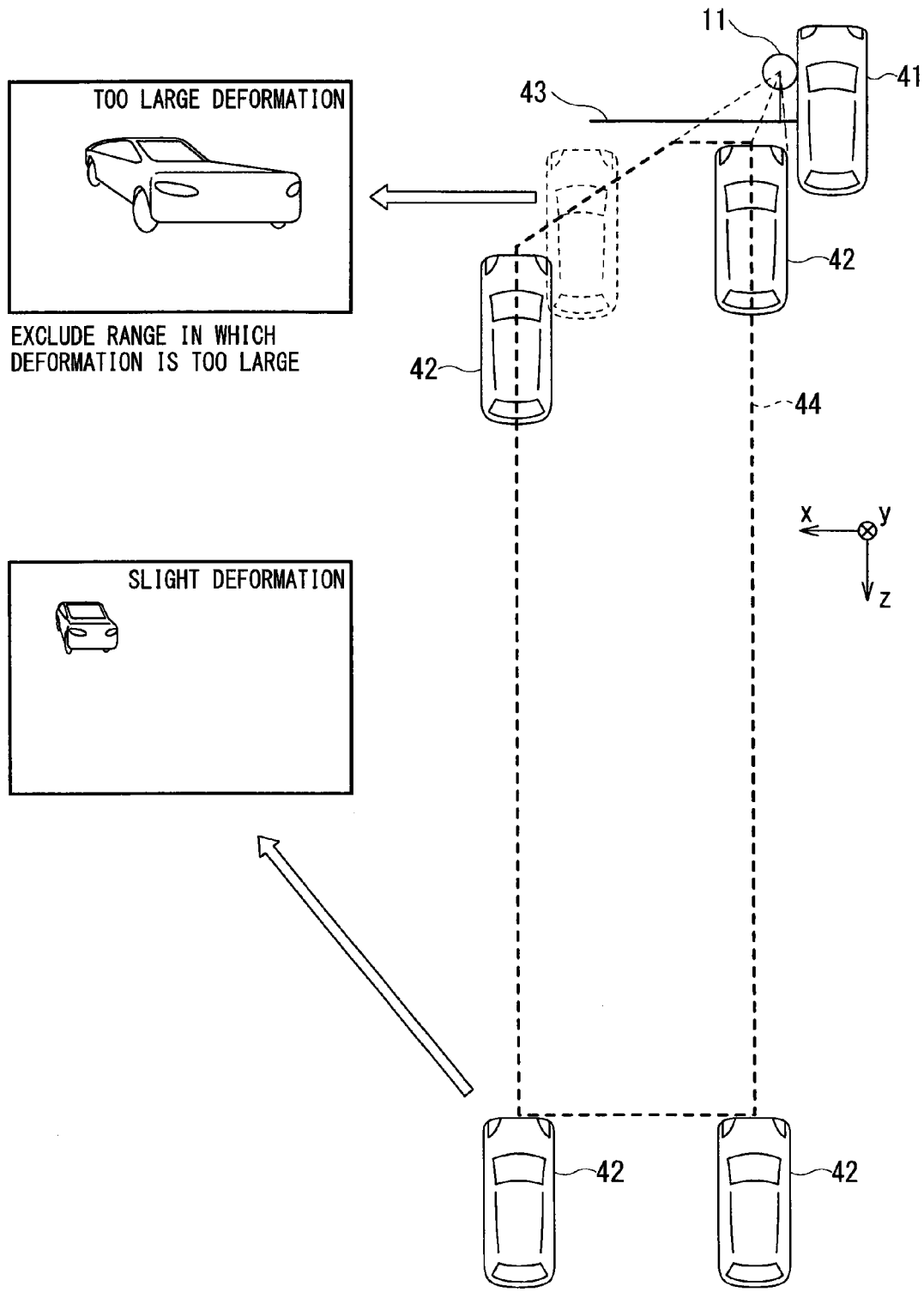
FIG. 3 is an explanatory diagram illustrating an example of a predetermined range set when a dictionary is generated by the dictionary generating unit.

FIG. 3 is an explanatory diagram illustrating an example of a predetermined range 44 set when a dictionary is generated by the dictionary generating unit 21.

In the present embodiment, a processed image is generated along a line-of-sight axis parallel and directly opposite to a traveling direction of the own car 41 using a camera 11 with a wide field angle (see FIG. 3). By placing a detection object 42 at plural locations in a predetermined range 44 in an imaging range such that a predetermined line-of-sight axis 40 of the camera 11 and a direction of a normal to a detection plane of the detection object 42 will be parallel to each other, allowing the detection object 42 to be detected based on a positional relationship between the line-of-sight axis 40 such as shown in FIG. 3 and the direction of the normal to the detection plane, the dictionary generating unit 21 according to the present embodiment generates a dictionary in advance using an image of the detection object 42 picked up by the camera 11 at each of the plural locations.

The predetermined range 44 is set by the detection unit 23 as a detection object. A shape changes more greatly at a location displaced greatly from a center than at the center. Therefore, it is advisable that the predetermined range 44 is not subject to too large shape changes and is, for example, approximately from 30 degrees to 60 degrees (e.g., up to 45 degrees) outward of the own car 41 from the line-of-sight axis 40 parallel to the traveling direction of the own car 41. Also, when the detection object 42 is a truck or bus, the detection plane is considered to be more parallel. Thus, the predetermined range 44 may be extended to about 85 degrees outward of the own car 41 from the line-of-sight axis 40 parallel to the traveling direction of the own car 41.

Also, for example, when the range goes beyond 45 degrees outward of the own car 41 from the line-of-sight axis 40, a flank of the detection object 42 will also become visible. Therefore, when the range goes beyond 45 degrees, a dictionary may be generated separately in advance with the flank of the detection object 42 set as a detection plane and with the line-of-sight axis 40 set parallel to the direction of a normal to the flank (direction perpendicular to the traveling direction of the own car 41).

In so doing, a small area such as part of a flank in forward part of the vehicle or a tire may be used as the detection plane. The use of a small area as the detection plane in generating a dictionary with the line-of-sight axis 40 set parallel to the direction of the normal to the flank reduces effects in which a resolution is reduced with increases in distance and the flank of the detection object 42 is deformed (when the flank is not a perfect plane) with increases in distance.

In FIG. 3, an example is shown in which assuming that another car running adjacently to the own car 41 in a traffic lane next to a traffic lane in which the own car 41 is running will be detected. In the example, within a predetermined distance from the camera 11, the predetermined range 44 is set to be a range up to 45 degrees outward of the own car 41 from the line-of-sight axis 40. Also in the example, at distances farther away from the camera 11 than the predetermined distance, the predetermined range 44 is set to be a range up to a predetermined distance outward of the own car from the line-of-sight axis 40.

(Generation of Image Pyramid)

Next, the image pyramid generated by the processed-image generating unit 22 according to the present embodiment will be described.

Figure 4:
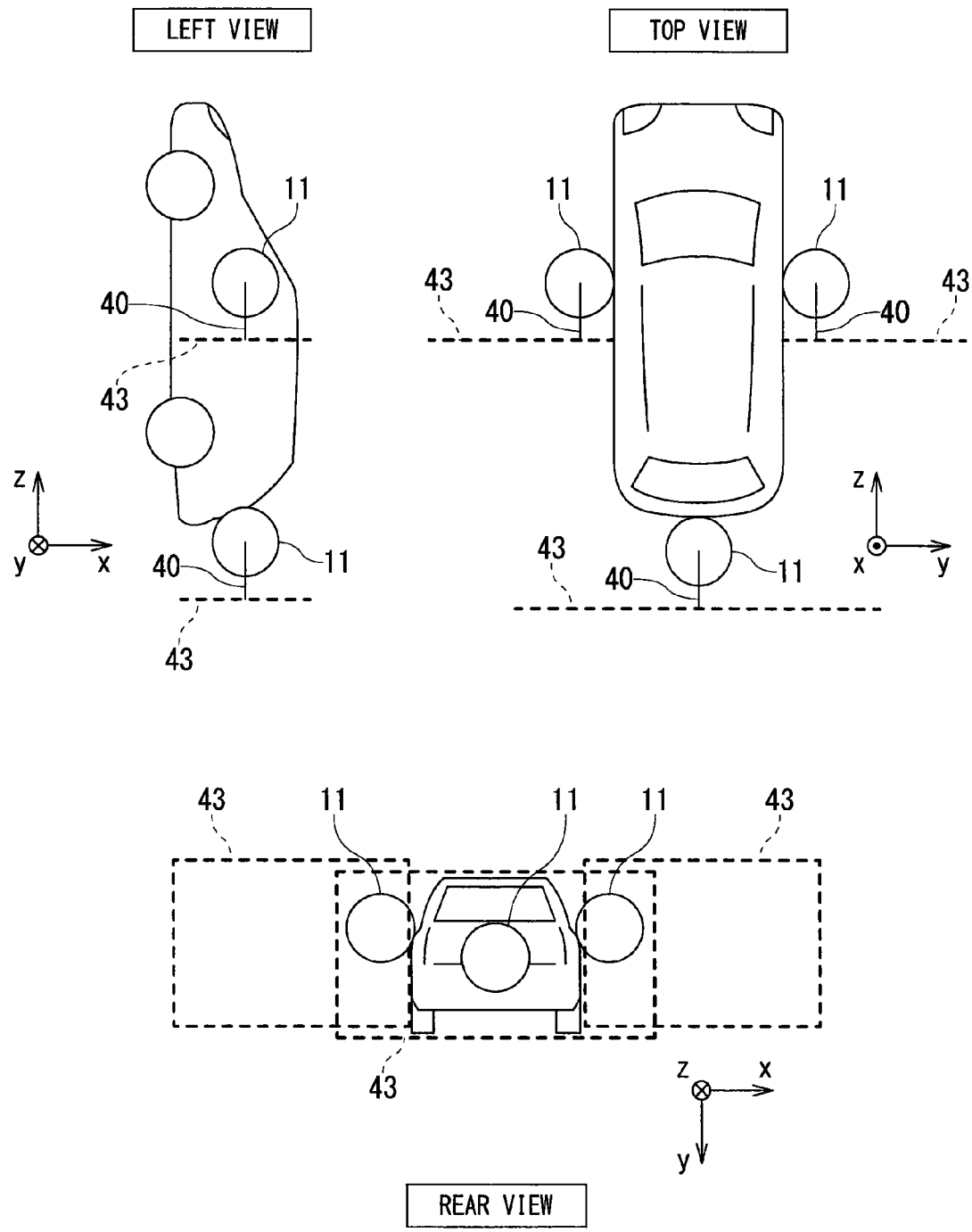
FIG. 4 is an explanatory diagram illustrating an example of the line-of-sight axis and projection plane of each of cameras provided on left, right, and rear parts to detect a front face of another car running alongside the own car.

FIG. 4 is an explanatory diagram illustrating an example of the line-of-sight axis 40 and projection plane 43 of each of cameras 11 provided on left, right, and rear parts to detect a front face of another car running alongside the own car 41. To detect the front face of another car running alongside the own car 41, the processed-image generating unit 22 generates a processed image perspectively projected onto the projection plane 43 with the line-of-sight axis 40 directed rearward parallel to the traveling direction of the own car 41, based on source images of the cameras 11.

Also, cameras 11 may be provided on left, right, and front parts to detect a rear face of another car running alongside the own car 41. To detect the rear face of another car running alongside the own car 41, the processed-image generating unit 22 generates a processed image perspectively projected onto the projection plane 43 with the line-of-sight axis 40 directed forward parallel to the traveling direction of the own car 41, based on a source image of the cameras 11.

Also, cameras 11 may be provided on left, right, front, and rear parts to detect flanks of another car running alongside the own car 41. To detect the flanks of another car running alongside the own car 41, the processed-image generating unit 22 generates a processed image perspectively projected onto the projection plane 43 with the line-of-sight axis 40 perpendicular to the traveling direction of the own car 41, based on a source image of the cameras 11.

To detect the front face, flanks, and rear face of another car, separate dictionaries corresponding to respective line-of-sight axes 40 are used. These dictionaries are generated in advance by the dictionary generating unit 21. Of course, a dictionary corresponding to all the line-of-sight axes may be prepared to detect all the detection planes (front face, rear face, and flanks of another car).

Figure 5:
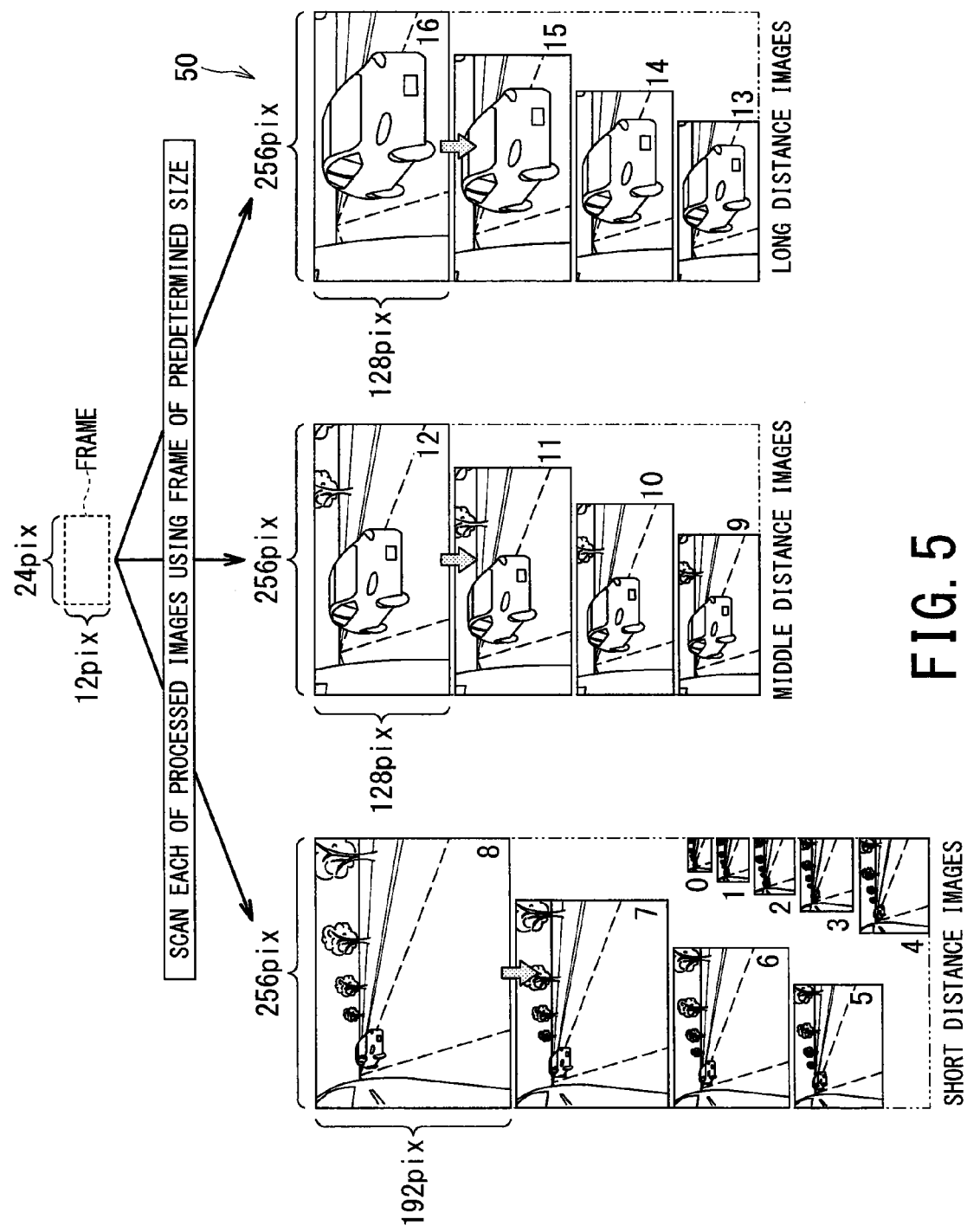
FIG. 5 is an explanatory diagram illustrating an example of image pyramids generated by the processed-image generating unit.

FIG. 5 is an explanatory diagram illustrating an example of image pyramids generated by the processed-image generating unit 22. Note that in FIG. 5, images are assigned numbers 0 to 16 in ascending order of scaling factor (ascending order of resolution). Also, FIG. 5 shows an example of classifying plural processed images into short distance images, middle distance images, and long distance images according to the scaling factor. FIG. 5 also shows an example in which the short distance images (0 to 8) are enlarged progressively one after another at a scaling-up factor of 1.3, the middle distance images (9 to 12) are enlarged progressively one after another at a scaling-up factor of 1.19, and the long distance images (13 to 16) are enlarged progressively one after another at a scaling-up factor of 1.19.

According to the present embodiment, the dictionary generated by the dictionary generating unit 21 is compatible with images of a predetermined size (e.g., 24 pixels wide by 12 pixels high) corresponding to the detection object 42. In this case, the detection unit 23 scans a frame of a predetermined size (e.g., 24 by 12 pixels) on processed images. On the other hand, the size of the detection object 42 on the processed images varies with the distance from the own car 41. For example, the detection object 42 appears smaller on the processed images when the detection object 42 is distant from the own car 41 than when close to the own car 41.

Therefore, the processed-image generating unit 22 generates an image group (image pyramid) 50 made up of plural processed images differing in the distance of the projection plane 43 set from the own car 41. In so doing, the processed-image generating unit 22 generates each processed image such that the processed image will have a line-of-sight axis 40 parallel to the direction of the normal to the detection plane, i.e., the same line-of-sight axis 40 as the line-of-sight axis 40 used for dictionary generation.

The distance from the own car 41 to the detection object 42 when the detection object 42 in the processed image coincides in size with the frame can be measured in advance. For example, let h denote the height of a frame, let f denote the focal length of an image, and let S denote actual height, then the distance D to a detection object can be expressed as follows.

$$D=f*s/h$$

Consequently, each processed image can be associated beforehand with the distance from the own car 41 to the detection object 42. The smaller the processed image is, the shorter the associated distance from the own car 41 becomes. Note that since the surfaces in the processed images are planar, the distance in each processed image is measured along a direction of the line-of-sight axis. The surfaces in the processed images may be cylindrical or spherical. For example, when the surface is cylindrical, the focal length is measured in a circular (two-dimensional) direction and the distance to the detection object 42 is measured in a circular (two-dimensional) direction. On the other hand, for example, when the surface is spherical, the focal length is measured in a spherical (three-dimensional) direction and the distance to the detection object 42 is measured in a spherical (three-dimensional) direction.

Incidentally, it is sufficient when processed images are associated with mutually different distances from the own car 41, and the processed images may be generated by scaling the source image of the camera 11 by a corresponding plurality of scale factors or may be generated at different distances from the own car 41 to the detection object 42 (e.g., at 2-meter intervals).

The processed-image generating unit 22 sets a projection plane 43 at intervals of a predetermined distance from the own car 41, and generates a processed image on each projection plane 43 based on the source image of the camera 11.

When all the projection planes 43 have a common line-of-sight axis 40, the detection unit 23 can apply a single dictionary to all the processed images of the image pyramid 50. Once the image pyramid 50 is generated, the detection unit 23 scans a frame of a predetermined size on each processed image and finds a detection frame and estimated distance thereof obtained by using a HOG dictionary based on a HOG feature value.

(Scan Frame)

Figure 6:
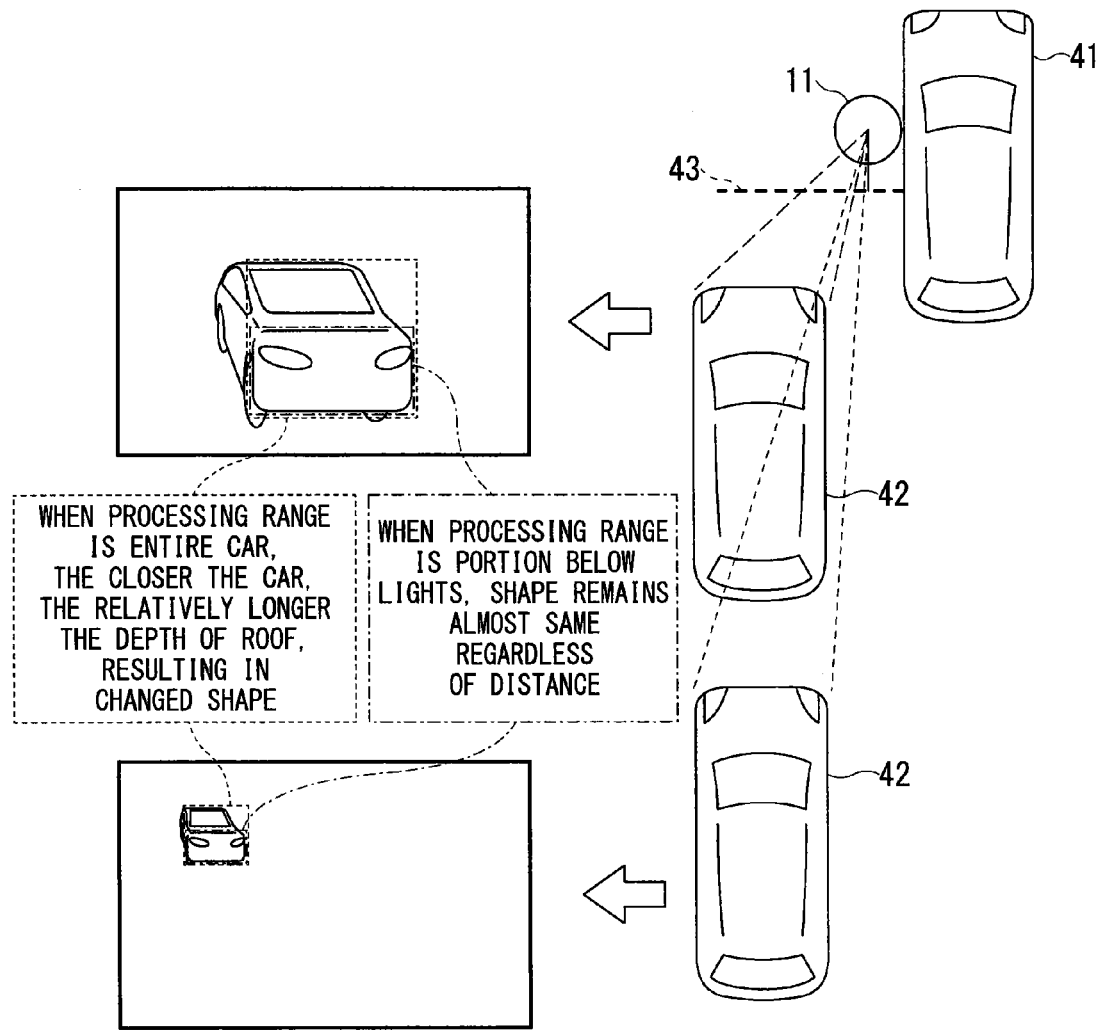
FIG. 6 is a diagram for describing a scan frame (area subjected to a HOG process: detection plane) used when the detection object is an automobile.

FIG. 6 is a diagram for describing a scan frame (area subjected to a HOG process: detection plane) used when the detection object 42 is an automobile.

The HOG processing unit 31 scans a scan frame of a size appropriate for the detection plane (HOG processing area) of the detection object 42 on the processed image, finds a HOG feature value using a HOG dictionary, and thereby finds likelihood at each scanning position. Based on the likelihood, the HOG result selection unit 33 finds the detection frame.

Preferably, the detection plane is an area which can be regarded to be planar to some extent when not perfectly planar. Therefore, when the detection object 42 is an automobile and the line-of-sight axis 40 is parallel to the traveling direction of the own car 41, it is advisable that the detection unit 23 set a neighborhood of front lights of an automobile (another car) as a detection plane. This is because since a portion around the front glass is located inward of the lights as viewed from the own car 41, when the other car is located nearby on a side of the own car 41, the processed image is created with the portion around the front glass and the neighborhood of the lights being laterally displaced from each other.

Note that when only locations distant from the own car 41 are included in the predetermined range 44, the portion around the front glass and the neighborhood of the lights almost coincide in depth with each other in a relative sense, making it possible to set the entire automobile including the front glass as the detection plane (HOG processing area).

Also, when the line-of-sight axis 40 is perpendicular to the traveling direction of the own car 41, a flank of another car can be set as a detection plane. Note that a small area such as part of a flank in forward part of the vehicle or a tire may be used as the detection plane. The use of a small area as the detection plane reduces effects in which a resolution is reduced with increases in distance and the flank of the detection object 42 is deformed (when the flank is not a perfect plane) with increases in distance.

Just the single dictionary accommodates a situation in which the detection object 42 is shown at a location away from a center of an image picked up by the camera 11 with a wide field angle and is more deformed in shape than when shown at the center of the image. Consequently, even if the detection object 42 in an image obtained by picking up a broad range using the camera 11 with a wide field angle is deformed in shape, the detection unit 23 can stably and flexibly detect the detection object 42 using a single dictionary while preventing misdetection.

Also, the image processing apparatus 10 can detect a detection object 42 located in a broad range using a single dictionary. This makes it possible to greatly reduce storage requirements compared to when plural dictionaries are used as well as reduce a load required for a detection process and cut processing time. Also, when another car is close to the own car 41, the image processing apparatus 10 can set the line-ofsight axis 40 to a direction perpendicular to the traveling direction of the own car 41, set the predetermined range 44 to a broad range along the traveling direction of the own car 41, and set a flank of the other car or a detection object as a detection plane. Consequently, especially when cameras 11 are provided near the side mirrors, another car trying to get ahead of the own car 41 can be monitored until the other car comes close to the own car 41.

(Setting a Scan Frame according to Detection Object)

When the detection object 42 is an automobile, a height Hh and width Hw of the detection frame, whose frame size and position are obtained by normalizing size and position of the scan frame with high likelihood onto the normalized image, can be associated with actual height Oh and width Ow (e.g., height Oh=0.5 m and width Ow=1.7 m in the neighborhood of the lights on the front face) of a detection plane. This makes it possible to find the distance of the detection object 42 from the own car 41 based on information about the position and size of the detection frame on the normalized image.

On the other hand, when the detection objects 42 vary in size, when the ground position is limited, processing is performed easily. In the processed image, the more distant the position of the ground, the higher the ground is. For each location on the ground, scanning is performed only in a transverse direction in one processed image. Thus, the detection unit 23 classifies detection objects 42 into plural size categories, provides scan frames of mutually different sizes for respective size categories, and scans the scan frame of each size category on each of plural processed images making up the image pyramid 50.

Examples in which detection objects 42 vary in size include a case in which detection objects 42 are persons. The height of people varies greatly according to age and the like.

Figure 7A:
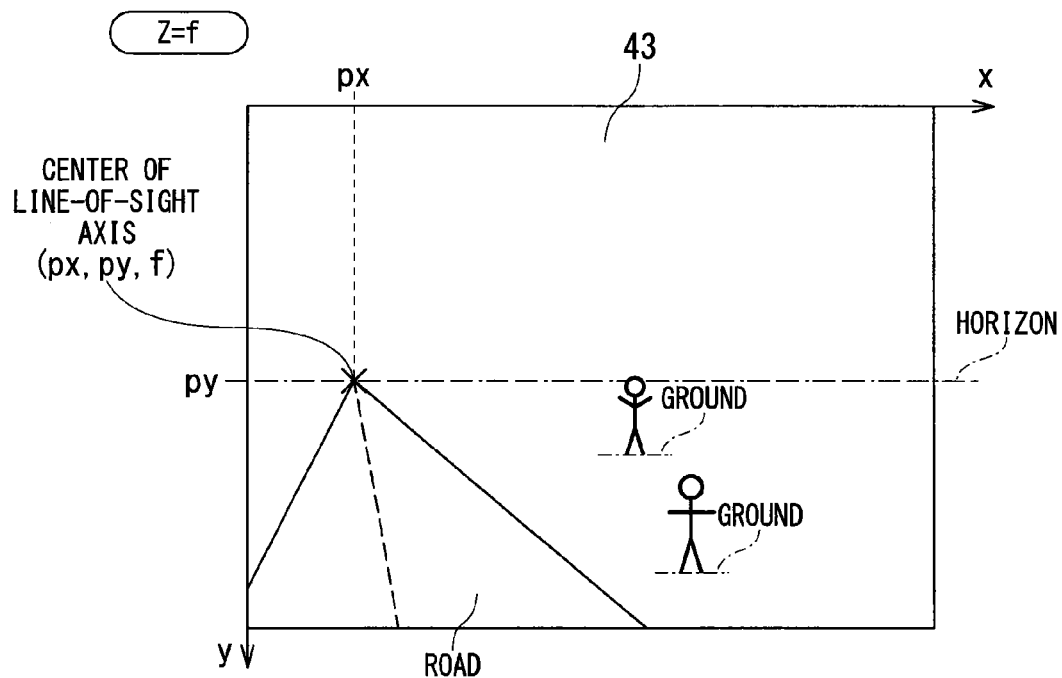
FIG. 7A is an explanatory diagram illustrating an example of a normalized image when the focal length is f.
Figure 7B:
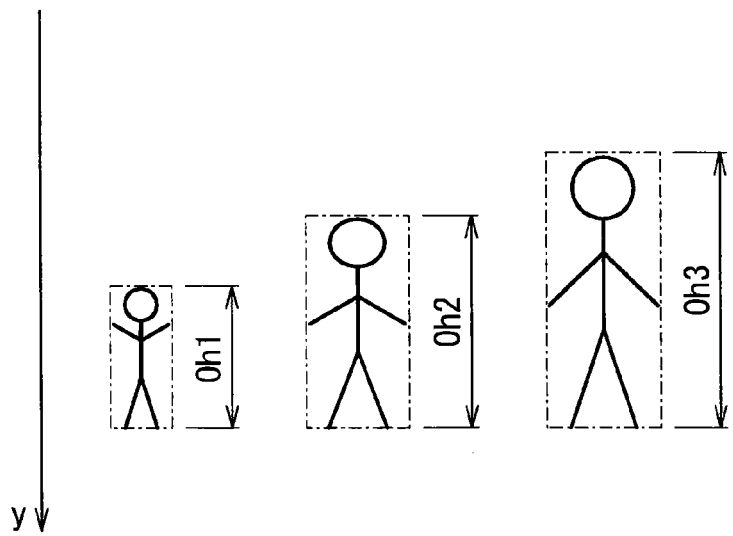
FIG. 7B is an explanatory diagram illustrating an example of how the heights Oh of scan frames are classified into three types when the detection object is a person.

FIG. 7A is an explanatory diagram illustrating an example of a normalized image when the focal length is f. FIG. 7B is an explanatory diagram illustrating an example of how the heights Oh of scan frames are classified into three types when the detection object 42 is a person.

If the ground position is limited as shown in FIG. 7A, scan frames can be set at certain size intervals of the detection object 42. In this case, calculations can be performed assuming that the height Oh is common to detection frames obtained by scanning each scan frame, differing among scan frames.

When detection objects 42 are persons, actual heights Oh of the detection objects 42 are classified into three groups, for example, as shown in FIG. 7B: Oh1=0.75 m (0.45 m to 1.05 m), Oh2=1.25 m (0.95 m to 1.55 m), and Oh3=1.75 m (1.45 m to 2.05 m). A person of a height intermediate between two resulting groups will be detected redundantly. In that case, a group for which more detection frames are obtained or a group which has higher likelihood can be adopted.

Figure 8A:
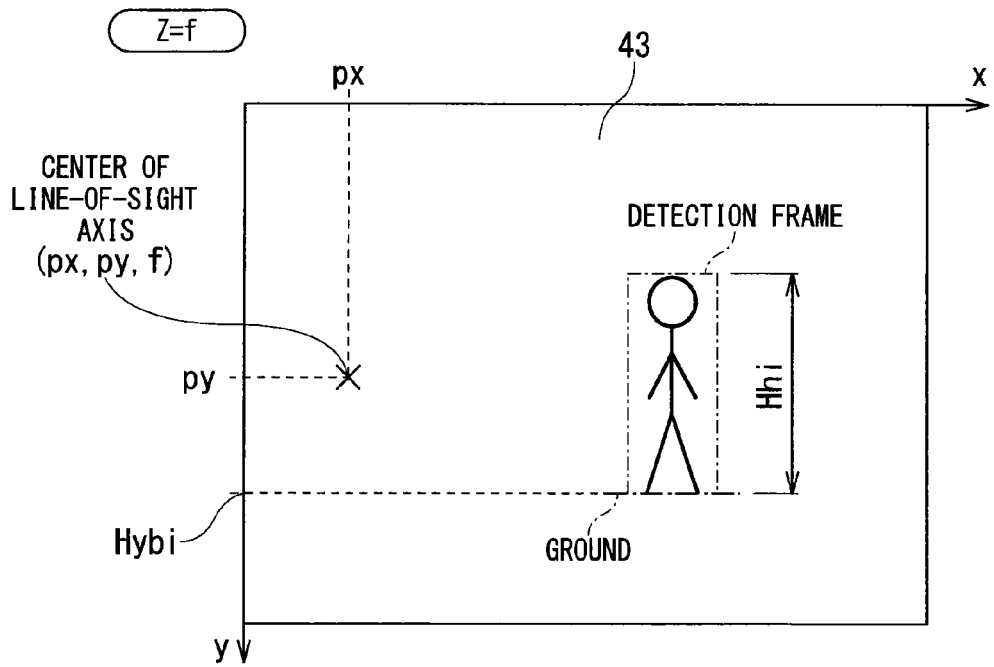
FIG. 8A is an explanatory diagram illustrating an example of a focus position image in which a person standing on the ground is detected.
Figure 8B:
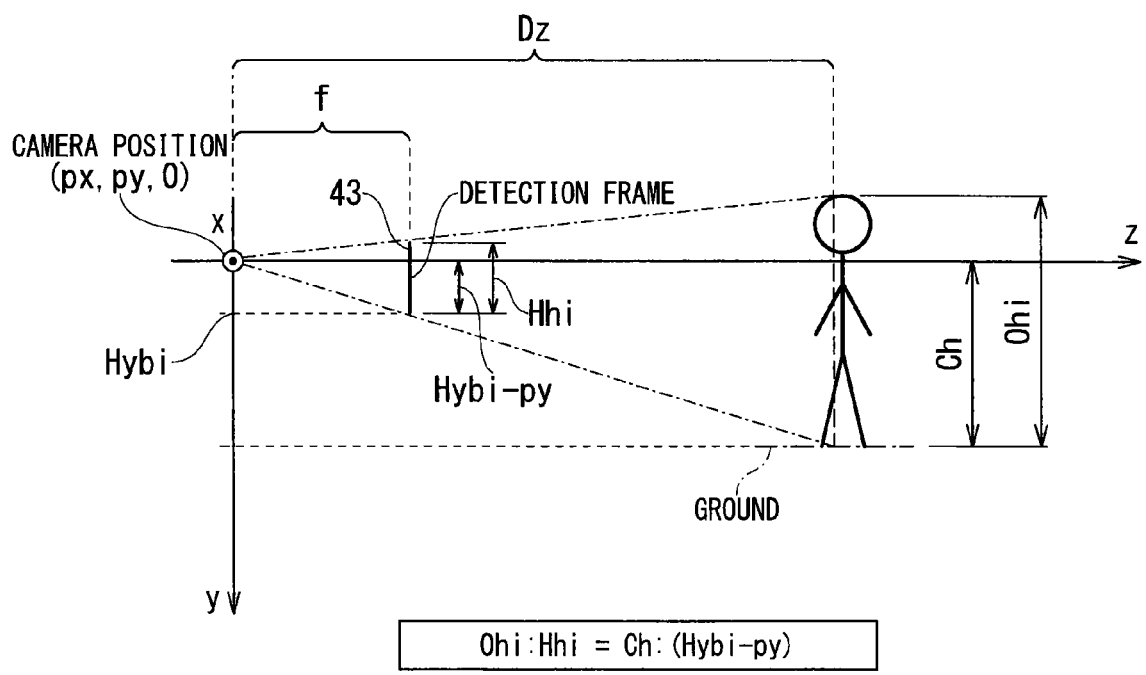
FIG. 8B is a diagram for describing a method for calculating a lower end Hyb of the detection frame in the example shown in FIG. 8A.

FIG. 8A is an explanatory diagram illustrating an example of a focus position image in which a person standing on the ground is detected and FIG. 8B is a diagram for describing a method for calculating a lower end Hyb of the detection frame in the example shown in FIG. 8A.

Let Ch denote the height of the camera 11 from the ground, let Ohi (where i=1, 2, 3) denote the actual height of the detection object 42, let Hhi (where i=1, 2, 3) denote the height of the detection frame in a focus position image, and let (px, py, f) denote coordinates of the center of the line-of-sight axis in the focus position image. In this case, if a base of the detection frame is at the ground position as shown in FIG. 8A, position of a lower end Hybi (where i=1, 2, 3) of the detection frame in the focus position image can be expressed as follows.

$$Ohi:Hhi=Ch:(Hybi-py)$$

$$Hybi=(Hhi*Ch/Ohi)+py$$

In this way, when the actual height is used as a range (e.g., Oh1 is in a range of 0.45 m to 1.05 m in the above example), the vertical position has a margin. If this area alone is set as a scan frame, only detection frames close to the classified heights (with a difference of no larger than 0.3 m from the height in the above example) are obtained as a result. Thus, calculations can be performed assuming that the height Oh of the detection object 42 is common to the detection frames obtained by scanning each scan frame.

FIG. 9 is an explanatory diagram illustrating an example of a focus position image in which a person floating from the ground by a predetermined height is detected.

In detecting someone floating from the ground by a predetermined height ΔOhi (where i=1, 2, 3) as shown in FIG. 9, the lower end Hybi (where i=1, 2, 3) of the detection frame in a focus position image can be given by $$Hybi=[Hhi*(Ch-\Delta Ohi)/Ohi]+py$$

Thus, processing can be performed in a same manner as when a base of the detection frame is at the ground position.

(Outline of TTC Calculation Procedures)

Next, description will be given of a method used by the TTC calculation unit 24 according to the present embodiment to calculate TTC (time to collision).

Figure 10:
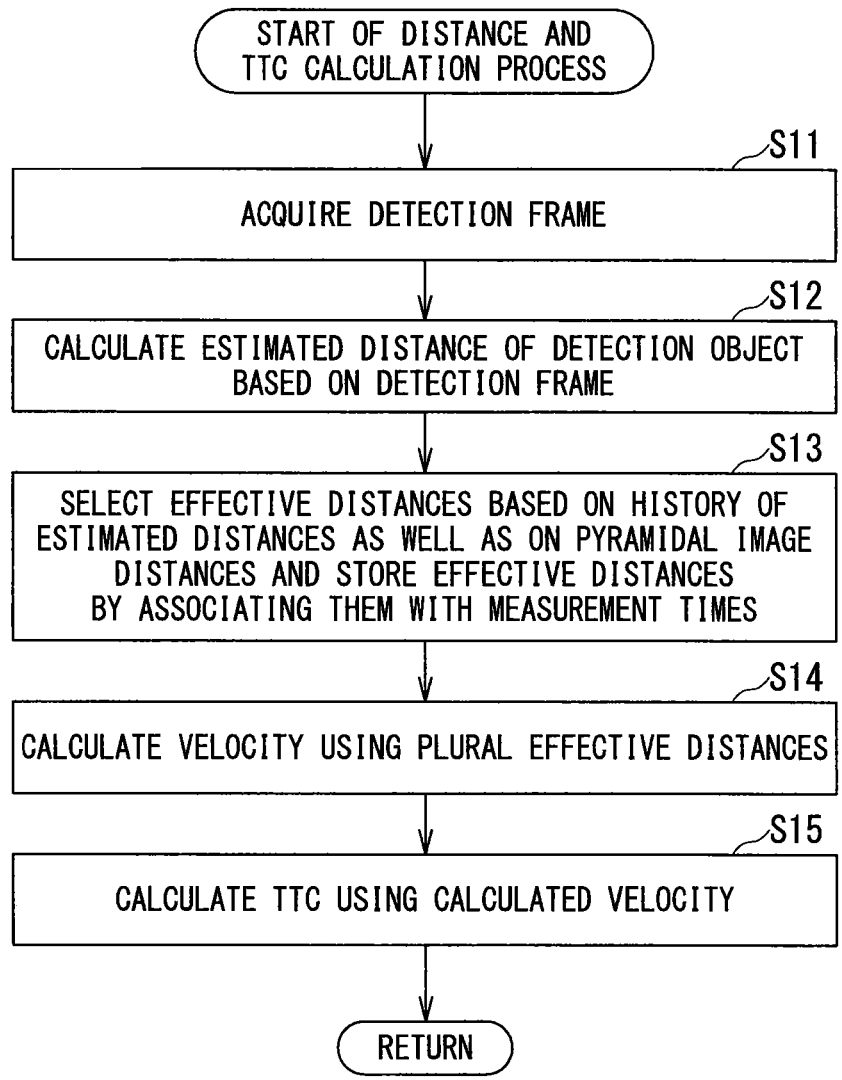
FIG. 10 is a subroutine flowchart showing an example of procedures of a TTC calculation process performed by the TTC calculation unit in step S7 of FIG. 2.

FIG. 10 is a subroutine flowchart showing an example of procedures of a TTC calculation process performed by the TTC calculation unit 24 in step S7 of FIG. 2.

In step S11, the TTC calculation unit 24 acquires a detection frame outputted by the HOG result selection unit 33.

Next, in step S12, the TTC calculation unit 24 calculates an estimated distance of the detection object 42 based on the detection frame.

Next, in step S13, the TTC calculation unit 24 selects plural effective distances based on a history of estimated distances as well as on pyramidal image distances and stores each of the selected effective distances and acquisition time of the estimated distance corresponding to the effective distance in the storage unit 13 by associating them with each other.

Next, in step S14, the TTC calculation unit 24 calculates velocity of the detection object 42 using plural effective distances.

Then, in step S15, the TTC calculation unit 24 finds the time TTC until the detection object 42 collides with the own car 41 using the calculated velocity, and then goes to step S8 in FIG. 2. Note that the time until the detection object 42 reaches a position a predetermined distance Dc away from the own car 41 may be used as TTC.

The above procedures allow TTC to be determined accurately using the history of estimated distances as well as pyramidal image distances.

(Method for Selecting Effective Distance)

Next, a method for selecting an effective distance will be described. Note that although the following description relates to a method for finding a distance in a z direction in the example shown in FIG. 3, a distance in an x direction can be found similarly.

Figure 11:
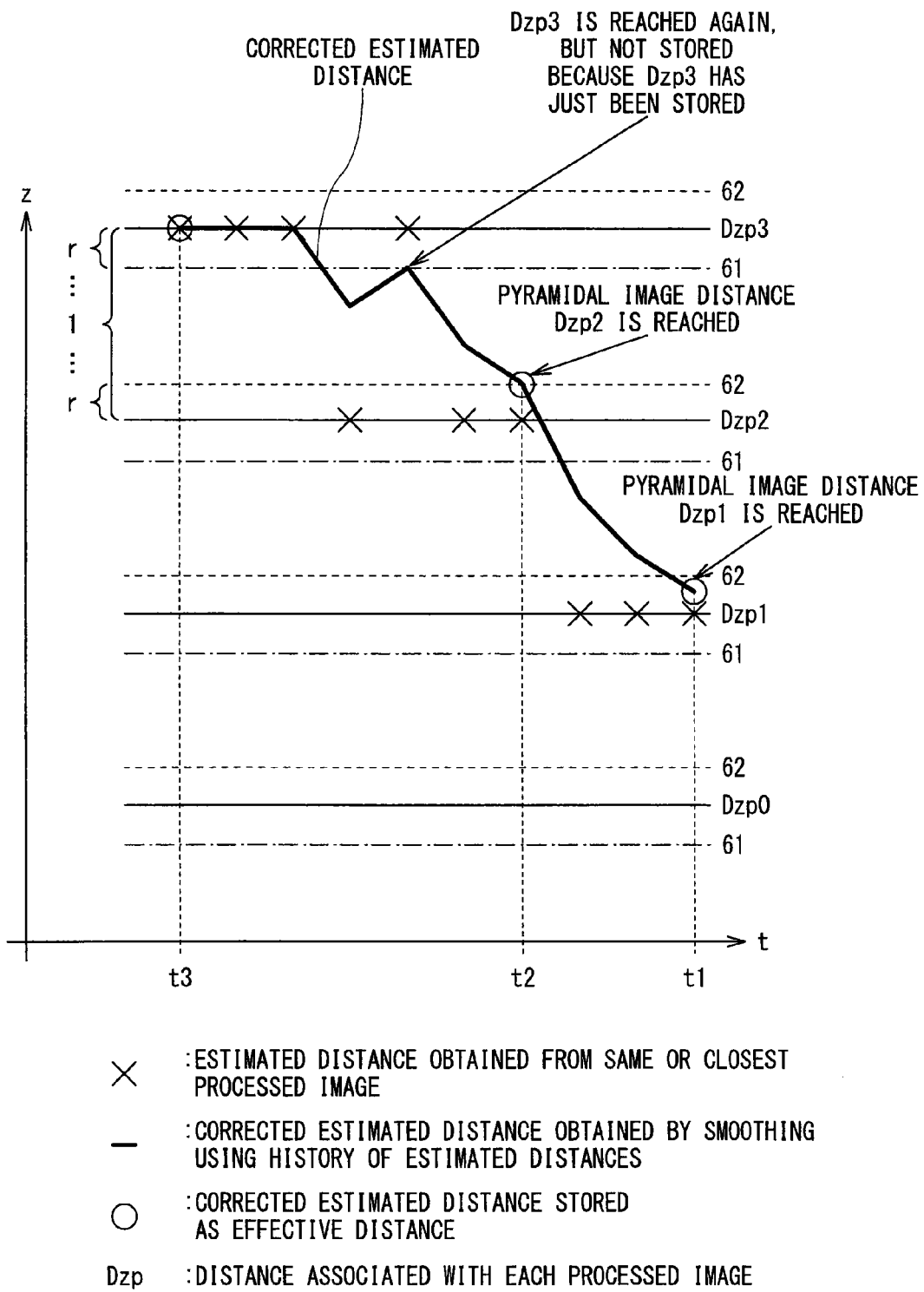
FIG. 11 is a diagram for describing a first method for selecting an effective distance.

FIG. 11 is a diagram for describing a first method for selecting an effective distance.

The first method for selecting an effective distance is a method for smoothing estimated distances based on the history of estimated distances using the pyramidal image distances when a single frame is detected or a single result with the highest likelihood is selected (when the distance of the detection frame coincides with one of the pyramidal image distances).

Let us consider a case in which pyramidal image distances are Dzp0, Dzp1, Dzp2, Dzp3, . . . in order of increasing distance from the own car 41. In so doing, ranges obtained by giving predetermined latitude to the distances Dzp0, Dzp1, Dzp2, Dzp3, . . . are designated as existence ranges of respective processed images, where the latitude equals a distance r*Δd, i.e., a predetermined ratio r (e.g., 0.2) of a distance Δd between adjacent processed images. That is, the existence range of each processed image is between a near boundary 61 and far boundary 62 as viewed from the own car 41.

With the first method for selecting an effective distance, the TTC calculation unit 24 finds a corrected estimated distance by correcting a current estimated distance α using the following correction equation including a previous estimated distance β and thereby smoothes estimated distances.

"corrected estimated distance"=β+(α−β)*c

Where a proportionality constant (0<c≤1) can be determined according to a maximum relative velocity of the detection object 42. For example, let Dzpi denote the nearest pyramidal image distance equal to or farther than the current estimated distance and let Dzpj denote the second nearest pyramidal image distance. If vmax is the maximum relative velocity (distance traveled during one process), a minimum time (the number of processes) tmin required to pass between two pyramids can be expressed as follows.

tmin=(Dpzi−Dpzj)/vmax

The proportionality constant c can be expressed as follows using a proportionality constant c0.

c=c0/tmin

Where the proportionality constant c0 is 1 for example, and the proportionality constant c may be limited by a maximum of 0.2 and a minimum of 0.05. Alternatively, the corrected estimated distance may be determined by limiting an amount of travel from the previous estimated distance β simply by the maximum relative velocity. Alternatively, the number of processes per unit time may be reduced with increases in adjacent pyramidal image distances.

When the current corrected estimated distance (see a straight line in FIG. 11) (or the current estimated distance) is in the existence range of a certain processed image and when the effective distance stored most recently does not belong to the processed image, the TTC calculation unit 24 selects the current corrected estimated distance (or the current estimated distance) as an effective distance and stores the selected estimated distance in the storage unit 13 together with an acquisition time of the current estimated distance. Also, when the existence range of the one processed image lies between the current corrected estimated distance (or the current estimated distance) and the previous determined estimated distance and when the effective distance stored most recently falls outside the existence range of the one processed image, the TTC calculation unit 24 selects the current corrected estimated distance (or the current estimated distance) as an effective distance and stores the selected estimated distance in the storage unit 13 together with an acquisition time of the current estimated distance. The number of the existence ranges lying between the current corrected estimated distance (or the current estimated distance) and the previous determined estimated distance may be one or more than one.

For example, at time t=t2 in FIG. 11, the current corrected estimated distance reaches the far boundary 62 at the distance Dzp2 and is in the existence range at Dzp2. Also, although the previous estimated distance at t=t2 is Dzp2 (see the first x to the left of t=t2), the previous corrected estimated distance does not belong to the existence range of any of the processed images. Therefore, the TTC calculation unit 24 selects the current corrected estimated distance Dzp2+γ or the current estimated distance Dzp2 as an effective distance, and stores the selected estimated distance in the storage unit 13 together with the acquisition time of the current estimated distance.

When plural processed images are spanned at a time, by ignoring the distances of the spanned processed images, the processed image to which the current corrected estimated distance belongs or the nearest of the spanned processed images may be regarded to exist in the existence range and the estimated distance of the processed image can be set as an effective distance.

The first selection method allows the positions and velocities of processed images to be found stably compared to when the distances of processed images, which are discrete values, are used sporadically.

Figure 12:
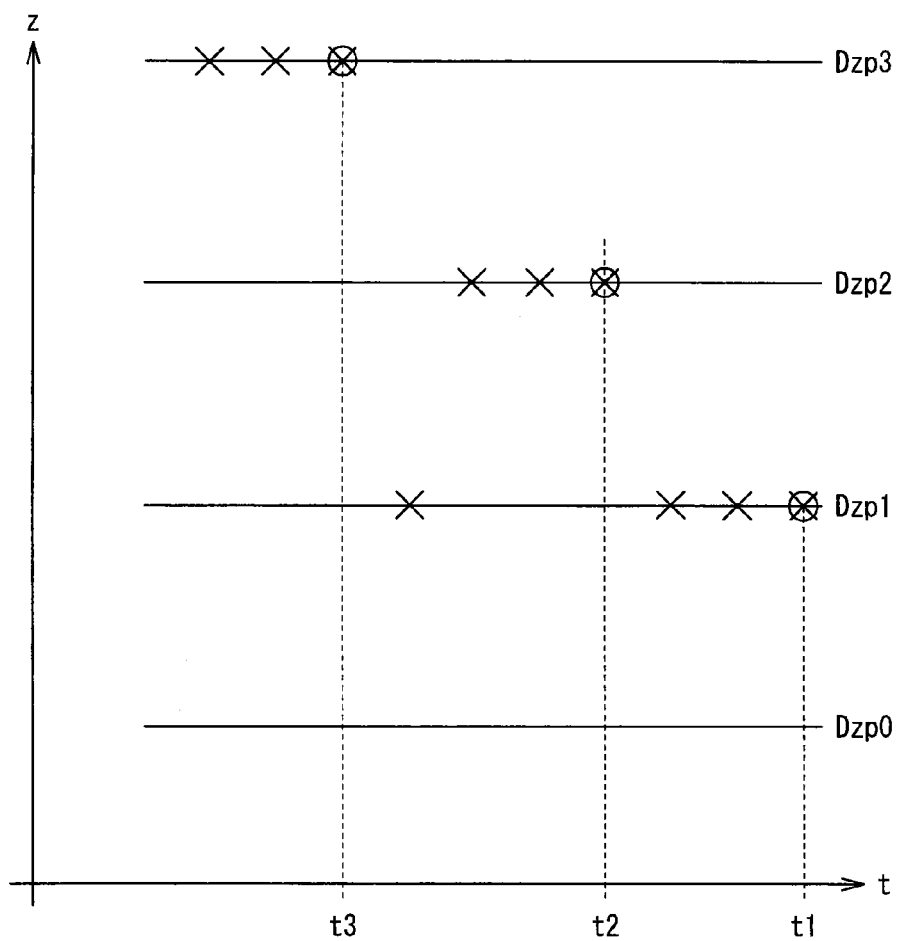
FIG. 12 is a diagram for describing a second method for selecting an effective distance.

FIG. 12 is a diagram for describing a second method for selecting an effective distance.

The second method for selecting an effective distance is a method for designating an estimated distance as an effective distance when the estimated distance falls within the existence range of one processed image a predetermined number of times successively or when the existence range of one processed image lies between the current estimated distance and the effective distance stored most recently, instead of smoothing estimated distances, in the case where a single frame is detected or a single result with the highest likelihood is selected (when the distance of detection frame coincides with one of the pyramidal image distances). The number of the existence ranges lying between the current estimated distance and the effective distance stored most recently may be one or more than one.

If the number of successive times is three, the TTC calculation unit 24 stores the estimated distance in the storage unit 13 together with the acquisition time when the estimated distance belongs to the existence range of a certain processed image three times successively (see FIG. 12).

The second selection method also allows the positions and velocities of processed images to be found stably compared to when the distances of processed images, which are discrete values, are used sporadically.

Figure 13:
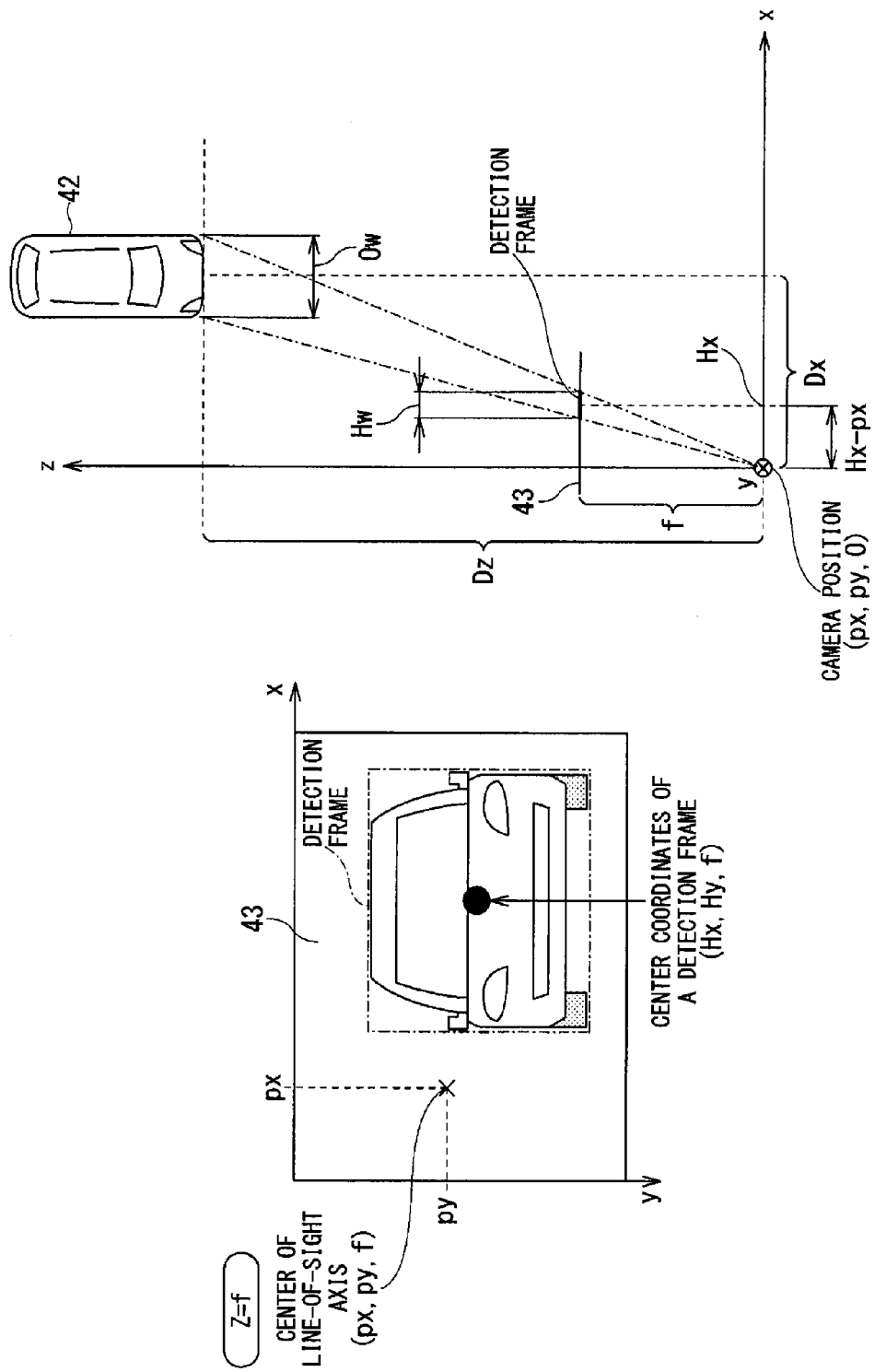
FIG. 13A is an explanatory diagram illustrating an example of a focus position image to describe a third method for selecting an effective distance.
FIG. 13B is a diagram for describing a method for calculating a distance Dz from the own car to the detection object in the example shown in FIG. 13A.

FIG. 13A is an explanatory diagram illustrating an example of a focus position image to describe a third method for selecting an effective distance and FIG. 13B is a diagram for describing a method for calculating a distance Dz from the own car 41 to the detection object 42 in the example shown in FIG. 13A.

The third method for selecting an effective distance is a method for calculating the distance Dz from the own car 41 to the detection object 42 based on sizes Hh and Hw of a detection frame and actual sizes Oh and Ow of the detection object 42 in the case of a simple average, likelihood-based weighted average of plural effective results, or the like (when the distance of detection frame does not coincide with one of the pyramidal image distances).

Let f denote a focal length, let (px, py, f) denote coordinates of the center of the line-of-sight axis in a normalized image, let Hh, Hw, and (Hx, Hy, f) denote the height, width, and center coordinates of a detection frame on the normalized image, and let Oh and Ow denote the actual height and width of the detection object 42. In this case, distances Dz and Dx from the own car 41 to the detection object 42 in the z and x directions can be expressed as follows, respectively.

$$Dz = f * Ow/Hw$$

$$Dx = (Hx - px) * Dz/f$$

It is expected that the distance Dz obtained by the calculation will be close to the distance Dzp0 and the like of the processed image although it depends on the velocity of the detection object 42 and layout resolution (distance interval) of processed images. Therefore, when the distance Dz obtained by the calculation falls within the existence range (e.g., Dzp2+γ) of a certain processed image, the distance (e.g., Dzp2) from the own car 41 associated with the processed image is treated as the current estimated distance. Also, estimated distances may be smoothed as with the first selection method.

Note that in the first to third selection methods, distances of some processed images may be skipped to reduce a load instead of processing the distances of all the processed images.

(Details of TTC Calculation Procedures)

It is advisable that the TTC calculation unit 24 calculates TTC when three or more effective distances are stored in the storage unit 13. TTC can be calculated when two effective distances, the acquisition times of the effective distances, and the current time are known. However, it is desirable not to use the effective distance stored first because it is not possible to determine whether the existence range of the processed image is reached at that time. Consequently, three or more stored values are required.

Figure 14:
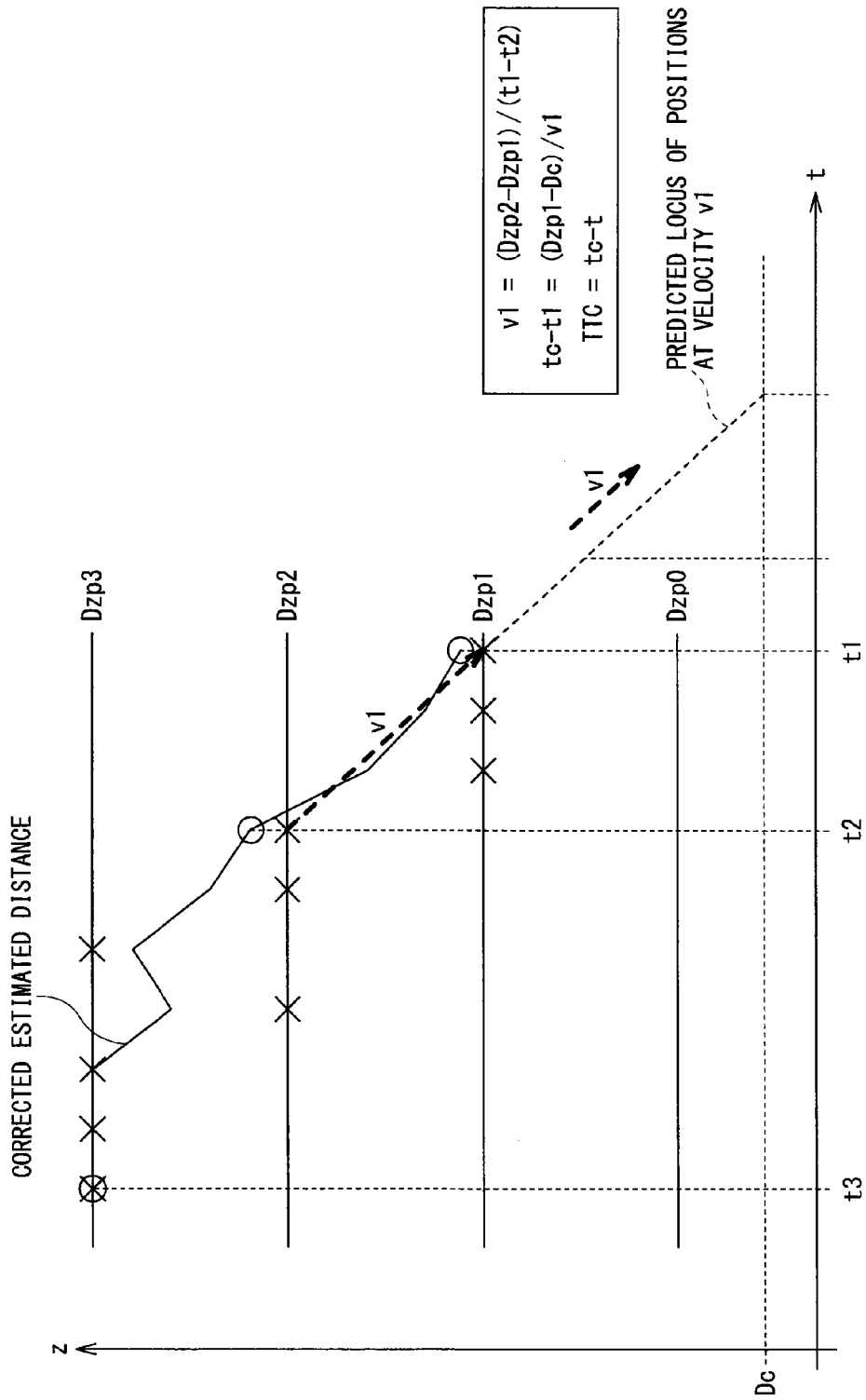
FIG. 14 is a diagram for describing a TTC calculation method based on effective distances.

FIG. 14 is a diagram for describing a TTC calculation method based on effective distances. Note that FIG. 14 shows an example in which the first method for selecting an effective distance shown in FIG. 11 is used and that the near boundary 61 and far boundary 62 are omitted to avoid complexity.

First, velocity v1 of the detection object 42 is found using two effective distances stored most recently and the acquisition times of the effective distances.

For example, consider a case in which the current time is t=t and the two effective distances stored most recently with respect to time and the acquisition times thereof are (Dzp1, t1) and (Dzp2, t2), respectively. In this case, the velocity v1 can be expressed as follows.

$$v1 = (Dzp2 - Dzp1)/(t1 - t2)$$

In this case, when it is known that the detection object 42 does not make a sharp move in a short time, if more than two effective distances are stored during a period (e.g., one second) regarded to be a short time, the velocity v1 may be calculated using the most recent and oldest effective distances within the period or using an average, a least squares method, or the like.

If the velocity v1 is used, the time TTC required for the detection object 42 to reach the position the predetermined distance Dc away from the own car 41 can be expressed as follows.

$$TTC = (Dzp1 - Dc)/v1 - (t - t1)$$

Where TTC represents the time required for the detection object 42 to reach the position the distance Dc away from the own car 41 when it is assumed that the detection object 42 moves at the velocity v1.

Figure 15:
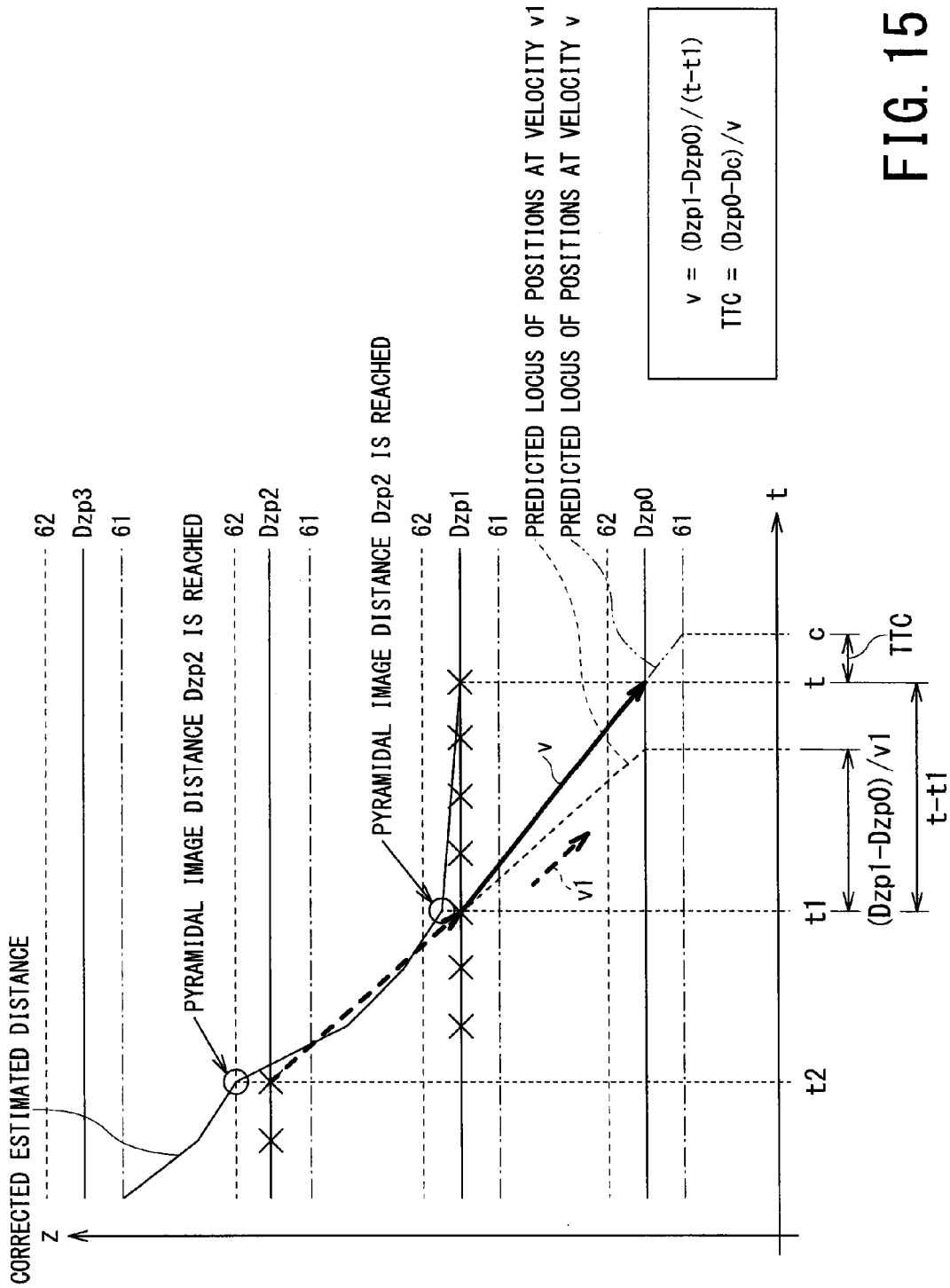
FIG. 15 is a diagram for describing a method for recalculating TTC when relative velocity between the detection object and own car falls.

FIG. 15 is a diagram for describing a method for recalculating TTC when relative velocity between the detection object 42 and own car 41 falls.

As shown in FIG. 15, after the existence range of a certain processed image (at Dzp1 in the example of FIG. 15) is reached, the relative velocity between the detection object 42 and own car 41 may become almost zero. In this case, the detection object 42 appears to have stopped moving in the existence range of the processed image. Consequently, actual TTC becomes longer than the TTC calculated based on the velocity v1 calculated by the method shown in FIG. 14.

For example, in the examples shown in FIGS. 14 and 15, a condition under which the detection object 42 has not reached Dzp0 yet even when the current time t=t becomes the time at which Dzp0 is predicted to be reached based on the velocity v1 can be expressed as follows.

$$t - t1 > (Dzp1 - Dzp0)/v1$$

Thus, assuming that the detection object 42 has just reached the distance (Dzp0 in the examples shown in FIGS. 14 and 15) of a next processed image from the distance (Dzp1 in the examples of FIGS. 14 and 15) to which the detection object 42 belonged during calculation of the velocity v1, the velocity is recalculated using the most recent effective distance and the acquisition time thereof (Dzp1, t1). If the recalculated velocity is v, since it is assumed that Dzp0 is reached at this current time t=t, v can be expressed as follows.

$$v = (Dzp1 - Dzp0)/(t - t1)$$

Using the recalculated velocity v, TTC can be recalculated as follows.

$$TTC' = (Dzp0 - Dc)/v$$

Where TTC' is the TTC recalculated using the above equation based on the recalculated velocity v. Also, allowing for a situation in which the detection object 42 has stopped moving due to an error, for a predetermined period after an expected arrival, instead of increasing the TTC' time by assuming that the detection object 42 has stopped moving, the TTC' may be updated with a same value or the TTC' may be decreased by assuming that the detection object 42 remains approaching.

Also, when a cause whereby the detection object 42 appears to have stopped moving in the existence range of the processed image is some trouble such as misdetection, there are cases in which the detection object 42 has actually approached the own car 41. In this case, when it is known that the detection object 42 does not make a sharp move in a short time, the velocity v may be calculated by assuming, for example, that magnitude of relative acceleration does not exceed a. By predicting an amount of change in the velocity v1 from t=t1 based on the relative acceleration, a range of the velocity v predicted based on the velocity v1 found from the most recent two effective distances can be expressed as follows.

$$v1 - a*(t - t1) = < v = < v1 + a*(t - t1)$$

Thus, TTC may be calculated by setting the velocity v in this range. Also, since the relative acceleration is relative acceleration between the camera 11 (own car 41) and detection object 42, when the image processing apparatus 10 is equipped with the vehicle information acquisition unit 14, a range of acceleration of the detection object 42 may be determined by offsetting acceleration and velocity of the camera 11 (own car 41) acquired from the vehicle information acquisition unit 14.

Also, the current distance Dz of the detection object 42 may be recalculated using the velocity v and TTC' recalculated in the example shown in FIG. 15.

$$Dz' = Dc + v*TTC'$$

Where Dz' denotes the recalculated current distance.

Note that although processing of the distance Dz along the z direction has been described, processing of the distance Dx along the x direction may be performed similarly or only smoothing of the estimated distance may be done.

Also, the position of the detection frame on the processed image may be modified using the recalculated current distance Dz'.

Figure 16A:
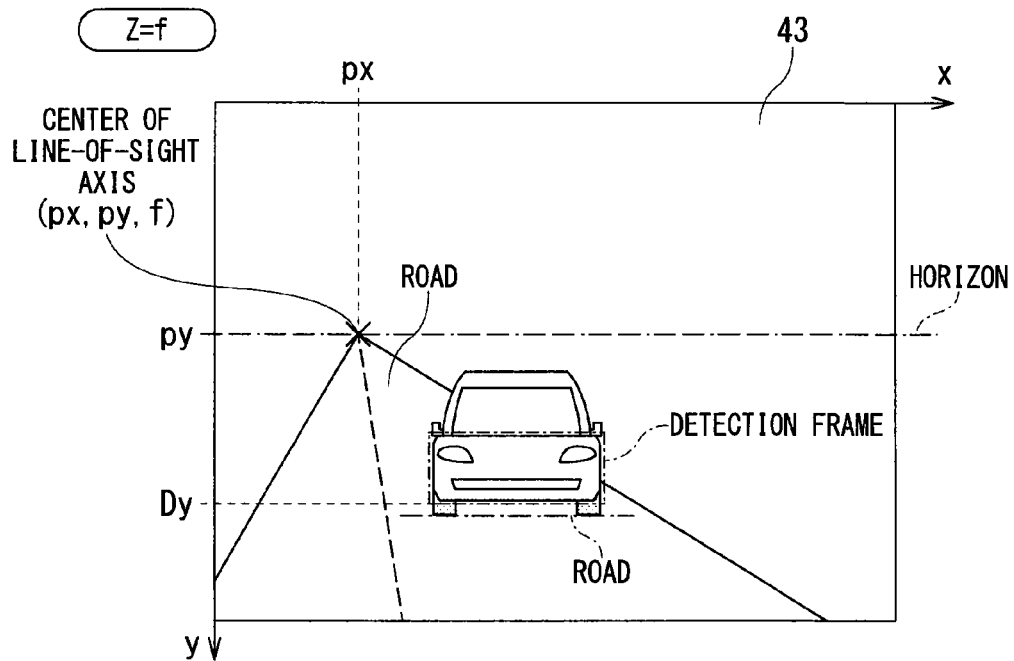
FIG. 16A is an explanatory diagram illustrating an example of a focus position image when the lower end of the detection frame is Dy above the ground.
Figure 16B:
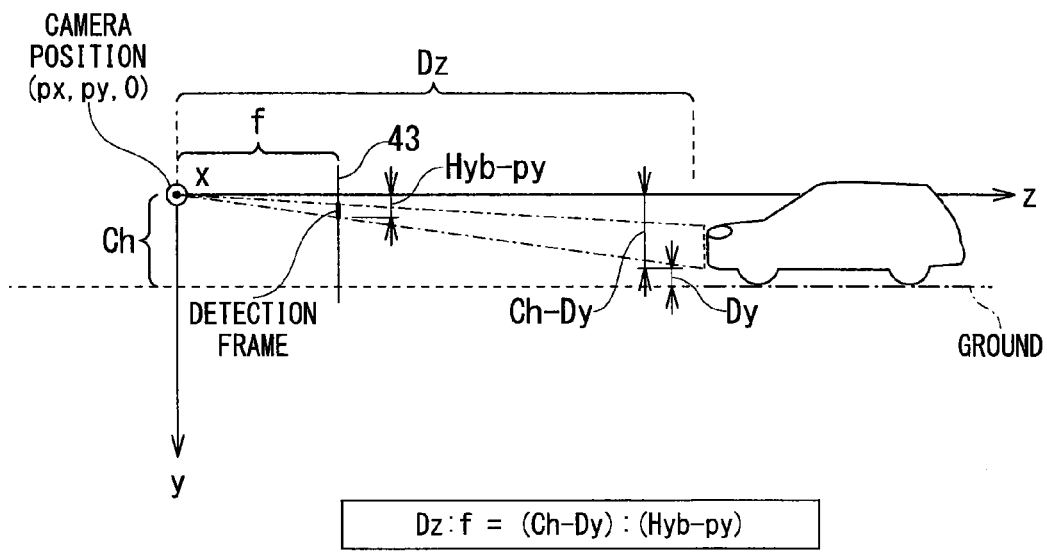
FIG. 16B is a diagram for describing a method for modifying the position of the detection frame on the processed image using the recalculated distance Dz' in an example shown in FIG. 16A.

FIG. 16A is an explanatory diagram illustrating an example of a focus position image when the lower end of the detection frame is Dy above the ground and FIG. 16B is a diagram for describing a method for modifying the position of the detection frame on the processed image using the recalculated distance Dz' in an example shown in FIG. 16A.

Suppose, for example, the lower end, upper end, or intermediate part of the detection frame is the height Dy above the ground. Also, when the ground is inside the detection frame, whose lower end is buried under the ground, the height Dy from the ground is negative. Incidentally, if Dy is not the height from the ground, Dy may be left as a fixed value. Alternatively, the height Dy may be calculated beforehand since it is assumed that the height Dy will look different depending on the type and size of the detection object 42. In this case, heights from the ground may be calculated beforehand from sizes of the detection frame used for past detection, estimated distances obtained as a result, and positions of the base and then the height Dy may be calculated beforehand based on an average of the heights calculated or based on results of the least square method applied to the heights calculated.

For example, if Ch is the height of the camera 11 from the ground and Hyb is the position of the base of the detection frame, Dy is given by the following equation.

$$Dz{:}f = (Ch-Dy){:}(Hyb-py)$$

$$Dy = Ch - (Hyb-py)*Dz*f$$

As an equation which does not use the height Ch of the camera 11, the following equation uses a position Dy' from the horizon instead of Dy.

$$Dz{:}f = Dy'{:}(Hyb-py)$$

$$Dy' = (Hyb-py)*Dz*f$$

As discussed above, the image processing apparatus 10 according to the present embodiment can find estimated distances as a result of a HOG process using processed images (component images of an image pyramid) associated with discrete distances and calculate TTC using a history of the estimated distances as well as pyramidal image distances. Consequently, the image processing apparatus 10 can detect the detection object 42 contained in a processed image using an image pyramid generated from images acquired by the camera 11 and accurately predict the TTC (time to collision) of the detected detection object 42.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the source image used by the image processing apparatus 10 does not have to be a source image of the camera 11 provided on the vehicle, and may be an image picked up by a typical surveillance camera such as a camera provided on a street light.

The invention claimed is:

1. An image processing apparatus comprising:
a processed-image generating unit configured to acquire an image around a vehicle picked up by a camera provided on the vehicle and generate a plurality of processed images by scaling the image picked up by the camera by a corresponding plurality of scale factors;
a detection unit configured to scan each of the plurality of processed images by a frame having a predetermined size according to a detection object, determine likelihood at each scanning position using a dictionary of the detection object, and detect a scan frame having likelihood higher than predetermined likelihood, the plurality of processed images being associated in advance with a corresponding plurality of image distances, each of the plurality of image distances being a predetermined estimated distance from the vehicle; and
a calculation unit configured to determine a determined estimated distance from the vehicle to the detection object according to an image distance associated with a processed image to which the scan frame detected by the detection unit belongs, and calculate and output, based on a history of determined estimated distances and on the plurality of image distances, a time until the vehicle and the detection object collide with each other.

2. The apparatus according to claim 1, wherein:
the detection unit normalizes a size and position of the scan frame detected by the detection unit with respect to a reference image, and outputs a detection frame obtained by normalization of the scan frame detected by the detection unit; and
each of the plurality of image distances is a distance estimated based on a relationship between each of the plurality of processed images and the reference image.

3. The apparatus according to claim 2, wherein the calculation unit determines a plurality of effective distances from the determined estimated distances based on the history of the determined estimated distances and the plurality of image distances, stores in a storage unit the plurality of effective distances in association with a corresponding plurality of acquisition times of the determined estimated distances corresponding to respective ones of the plurality of effective distances, determines a velocity of the detection object using effective distances out of the plurality of effective distances and the corresponding acquisition times, and calculates and outputs the time to collision using the velocity.

4. The apparatus according to claim 3, wherein the calculation unit designates a distance, obtained by substituting into a correction equation the image distance associated with the processed image to which the scan frame detected by the detection unit belongs, as a current determined estimated distance, the correction equation including a previous determined estimated distance.

5. The apparatus according to claim 4, wherein the calculation unit designates ranges, obtained by giving predetermined latitude to each of the plurality of image distances, as existence ranges of each of the plurality of processed images, selects the current determined estimated distance as the effective distance when the current determined estimated distance falls within an existence range of one processed image and the effective distance stored most recently falls outside the existence range of the one processed image or when the existence range of the one processed image lies between the current determined estimated distance and the previous determined estimated distance and the effective distance stored most recently falls outside the existence range of the one processed image, and stores the selected current determined estimated distance as the effective distance in the storage unit in association with the acquisition time of the selected current determined estimated distance.

6. The apparatus according to claim 5, wherein the calculation unit calculates a distance from the vehicle to the detection object based on a size of the detection frame and an actual size of the detection object, and designates, when the calculated distance falls within the existence range of the one processed image, an image distance associated with the one processed image as the current determined estimated distance.

7. The apparatus according to claim 3, wherein the calculation unit designates ranges, obtained by giving predetermined latitude to each of the plurality of image distances, as existence ranges of each of the plurality of processed images, selects the current determined estimated distance as the effective distance when determined estimated distances including the current determined estimated distance fall within an existence range of one processed image a predetermined number of times successively or when the existence range of one processed image lies between the current determined estimated distance and the effective distance stored most recently, and stores the selected current determined estimated distance as the effective distance in the storage unit in association with the acquisition time of the selected current determined estimated distance.

8. The apparatus according to claim 3, wherein the calculation unit recalculates the velocity of the detection object based on a current time, on the effective distance stored most recently and on acquisition time of the effective distance stored most recently, and recalculates the time to collision based on the recalculated velocity.

9. The apparatus according to claim 8, wherein the calculation unit calculates and outputs a distance at the current time from the vehicle to the detection object based on the recalculated velocity and the recalculated time to collision.

10. The apparatus according to claim 9, wherein the calculation unit modifies a position of the frame having the predetermined size on the reference image using the distance at the current time.

11. The apparatus according to claim 1, wherein the detection unit classifies detection objects into a plurality of size categories, provides frames of mutually different sizes for respective size categories, and scans each of the plurality of processed images by each of the frames of mutually different sizes.

12. The apparatus according to claim 1, further comprising a warning unit configured to notify a driver of the vehicle of information outputted from the calculation unit using at least one of a voice output via a speaker, a buzzer output via the speaker, and a warning display on a display device provided at a position visible to the driver.

13. An image processing method comprising:
  acquiring an image around a vehicle picked up by a camera provided on the vehicle;
  generating a plurality of processed images by scaling the image picked up by the camera by a corresponding plurality of scale factors;
  scanning each of the plurality of processed images by a frame having a predetermined size according to a detection object;
  determining likelihood at each scanning position using a dictionary of the detection object;
  detecting a scan frame having likelihood higher than predetermined likelihood, the plurality of processed images being associated in advance with a corresponding plurality of image distances, each of the plurality of image distances being a predetermined estimated distance from the vehicle;
  determining a determined estimated distance from the vehicle to the detection object according to an image distance associated with a processed image to which the scan frame detected by the detecting step belongs; and
  calculating, based on a history of determined estimated distances and on the plurality of image distances, a time until the vehicle and the detection object collide with each other.

14. A non-transitory computer readable medium having instructions stored therein causes, when executed by a computer, to execute the steps of the method according to claim 13.

* * * * *